United States Patent
Kubo et al.

(10) Patent No.: US 9,594,399 B2
(45) Date of Patent: Mar. 14, 2017

(54) COMPUTER-READABLE STORAGE MEDIUM, DISPLAY CONTROL APPARATUS, DISPLAY CONTROL METHOD AND DISPLAY CONTROL SYSTEM FOR CONTROLLING DISPLAYED VIRTUAL OBJECTS WITH SYMBOL IMAGES

(75) Inventors: Kenta Kubo, Kyoto (JP); Mai Okamoto, Kyoto (JP); Chiaki Aida, Kyoto (JP); Toshikazu Kiuchi, Kyoto (JP); Naonori Ohnishi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 880 days.

(21) Appl. No.: 13/023,031

(22) Filed: Feb. 8, 2011

(65) Prior Publication Data

US 2012/0072857 A1    Mar. 22, 2012

(30) Foreign Application Priority Data

Sep. 22, 2010  (JP) ................................ 2010-212488

(51) Int. Cl.
| | |
|---|---|
| A63F 7/24 | (2006.01) |
| G06F 1/16 | (2006.01) |
| G06F 3/0488 | (2013.01) |

(52) U.S. Cl.
CPC .......... *G06F 1/1616* (2013.01); *A63F 7/2418* (2013.01); *G06F 1/1692* (2013.01);
(Continued)

(58) Field of Classification Search
CPC ............... G06F 3/0481; G06F 3/04815; G06F 3/04817; G06F 3/04842; A63F 13/00;
(Continued)

(56) References Cited

U.S. PATENT DOCUMENTS

| | | |
|---|---|---|
| 8,337,284 B2 | 12/2012 | Nishimura et al. |
| 2005/0176502 A1* | 8/2005 | Nishimura et al. ............. 463/31 |

(Continued)

FOREIGN PATENT DOCUMENTS

| | | |
|---|---|---|
| JP | 2000-176164 | 6/2000 |
| JP | 2005-218779 | 8/2005 |
| JP | 2009-266192 | 11/2009 |

OTHER PUBLICATIONS

Grosskopf, Neal; https://web.archive.org/web/20100126075432/http://www.nealgrosskopf.com/tech/thread.php?pid=64 Create an Icon Bouncing Effect With jQuery & CSS (published in Jaunary 26, 2010) Create an Icon Bouncing Effect With jQuery & CSS—Demo (published in Jan. 26, 2010).*

(Continued)

*Primary Examiner* — Rinna Yi
(74) *Attorney, Agent, or Firm* — Nixon & Vanderhye P.C.

(57) ABSTRACT

One or more objects and one or more icons corresponding to the one more objects, respectively, are simultaneously displayed on a screen of an upper LCD and a screen of a lower LCD, respectively. On the screen of the lower LCD, the one or more icons are placed in a plurality of placement areas and displayed. On the screen of the upper LCD, an object of the one or more objects, which corresponds to a respective icon of the one or more icons displayed on the screen of the lower LCD, is placed for display at a predetermined position with which the placement area in which the icon is placed is associated, in the virtual space.

22 Claims, 28 Drawing Sheets

(52) U.S. Cl.
CPC .. *G06F 3/04886* (2013.01); *A63F 2300/1075* (2013.01); *A63F 2300/204* (2013.01)

(58) Field of Classification Search
CPC .......... A63F 2300/64; A63F 2300/8011; A63F 13/53; A63F 2300/308; A63F 2300/5553; A63F 2300/556; A63F 2300/6607; A63F 2300/6623; A63F 2300/8052; A63F 2300/807; A63F 2300/8088
USPC ....... 715/750, 751, 753, 757, 758, 759, 761, 715/762, 763, 764, 769, 783, 804, 848; 436/2, 3, 4, 31
See application file for complete search history.

(56) References Cited

U.S. PATENT DOCUMENTS

| | | | | |
|---|---|---|---|---|
| 2006/0258455 | A1* | 11/2006 | Kando | 463/36 |
| 2006/0271870 | A1* | 11/2006 | Anwar | 715/764 |
| 2006/0288304 | A1* | 12/2006 | Nomoto et al. | 715/781 |
| 2007/0013665 | A1* | 1/2007 | Vetelainen et al. | 345/169 |
| 2007/0139419 | A1* | 6/2007 | Azuma | 345/474 |
| 2008/0076498 | A1* | 3/2008 | Yoshinobu et al. | 463/9 |
| 2009/0310594 | A1* | 12/2009 | Nakata | 370/350 |
| 2010/0017732 | A1* | 1/2010 | Matsushima et al. | 715/765 |
| 2011/0265041 | A1* | 10/2011 | Ganetakos | A63F 13/12 715/834 |

OTHER PUBLICATIONS

Screenshots for WarChess (Uploaded on Aug. 3, 2008) https://www.youtube.com/watch?v=jPHT3gLUk4o.*
Nintendo 3D5, Seishiki Happyo!! E3 2010 Report—Beru Ni Tsutsumaretela Miwakuno Hado Wo Tetteikaibo! Korede Keitai Gemu Ga Kawaru!?-, Shukan Fami-Tsu, vol. 25, 27$^{th}$ issue, Enterbrain, Inc., Jun. 24, 2010, pp. 12-13 [The Concise Explanation of the Relevance of This Reference is Found on p. 2 of the English Translation of the JP Office Action].
Japanese Office Action issued in Application Serial No. 2010-212488 dated Jul. 18, 2014 with English Translation.

* cited by examiner

F I G. 4
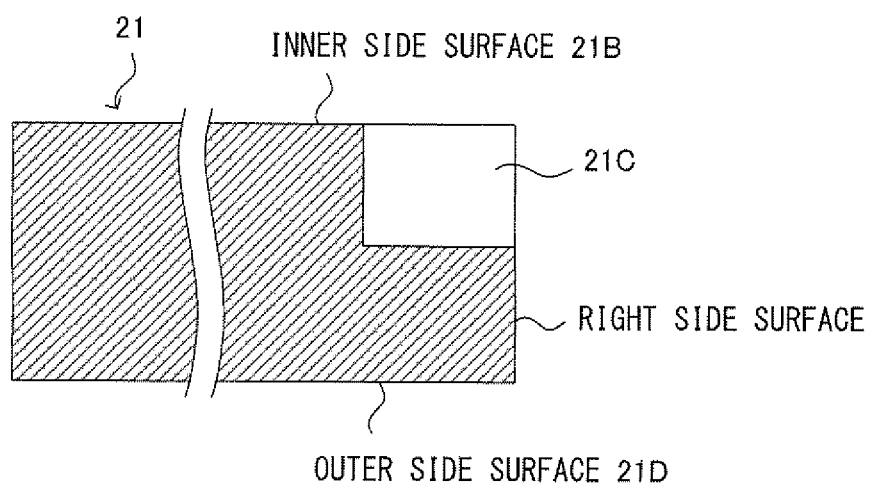

(THIRD POSITION)

(FIRST POSITION)

(SECOND POSITION)

COMPUTER-READABLE STORAGE MEDIUM, DISPLAY CONTROL APPARATUS, DISPLAY CONTROL METHOD AND DISPLAY CONTROL SYSTEM FOR CONTROLLING DISPLAYED VIRTUAL OBJECTS WITH SYMBOL IMAGES

CROSS REFERENCE TO RELATED APPLICATION

The disclosure of Japanese Patent Application No. 2010-212488, filed on Sep. 22, 2010, is incorporated herein by reference.

FIELD

The present invention relates to a computer-readable storage medium, a display control apparatus, a display control method, and a display control system, and more particularly, the computer-readable storage medium, the display control apparatus, the display control method, and the display control system for simultaneously displaying one or more objects and one or more symbol images which correspond to the one more objects, respectively.

BACKGROUND AND SUMMARY

Conventionally, there are apparatuses which change a position of an object placed in three dimensional virtual space, based on a user's input. For example, Japanese Laid-Open Patent Publication No. 2000-176164 (hereinafter, referred to as Patent Literature 1) discloses an apparatus that changes item positions, in accordance with input instructions given via operation buttons.

However, in the apparatus disclosed in Patent Literature 1, in sorting the items placed in a predetermined order, it is difficult to understand the positional relationship of the items from an operation screen, on which the sorting is performed, during the sort operation.

An object of the present invention is to provide a computer-readable storage medium, a display control apparatus, a display control method, and a display control system, which are capable of clearly displaying the positional relationship of one or more objects.

In order to achieve the object, the present invention employs the following features.

An example of a computer-readable storage medium of the present invention is a computer-readable storage medium having stored therein a display control program for simultaneously displaying one or more objects on a first display area, and one or more symbol images, which correspond to the one or more objects, respectively, on a second display area. The display control program causes a computer to function as symbol image display control means and object display control means. The symbol image display control means displays the one or more symbol images on the second display area, according to an order thereof. The object display control means places the one or more objects, which correspond to the one or more symbol images displayed on the second display area, respectively, at predetermined positions, with which the order of the one or more symbol images is associated, in a virtual space, and displaying the one or more objects on the first display area.

In another configuration example, the display control program may further cause the computer to function as move operation detecting means for detecting a move operation of at least one symbol image of the one or more symbol images displayed on the second display area, based on an input from an input device. The symbol image display control means may include symbol image move means for moving the at least one symbol image of the one or more symbol images displayed on the second display area to a position, in accordance with the move operation, and the object display control means may include object move means for moving at least one object of the one or more objects, which corresponds to the respective at least one symbol image, to a virtual space position corresponding to the position of the respective at least one symbol image moved by the symbol image move means.

According to the above configuration example, while performing the move operation of the symbol image, a user is able to verify, in real time, the position of the object which corresponds to the symbol image, in the virtual space, and thereby properly move a desired object to a desired position. Also, moving the symbol image allows the corresponding object to be moved, and therefore it is easy to determine the object to be moved, and designate the destination, as compared to directly moving the object in the virtual space. On the first display area, there is no need for displaying a cursor, a pointer, or the like, which is used for the determination of the object to be moved and designation of the destination. Therefore, the visibility of the first display area and reality are retained.

In still another configuration example, the symbol image display control means may include order change means for changing an order position of the at least one symbol image, based on the position of the at least one symbol image at a time point when the move operation of the at least one symbol image is ended.

According to the above configuration example, the user can easily change the order position of any of the symbol images.

In still another configuration example, the symbol image display control means may include: determination means for determining whether another of the one or more symbol images is displayed at the position of the at least one symbol image at a time point when the move operation of the at least one symbol image is ended; and order interchange means for interchanging an order position of the at least one symbol image with an order position of the another of the one or more symbol images, in the case where a determination result obtained by the determination means is affirmative.

According to the above configuration example, the user can easily interchange placement areas of any two symbol images with each other.

In still another configuration example, the object move means may move the at least one object for the move operation to a position at a height different from a height at which the other of the one or more objects is positioned, while the move operation is in progress.

According to the above configuration example, the user can easily discriminate the object for the move operation from the other objects, while watching the first display area.

In still another configuration example, the input device may include a pointing device configured to designate a position in the second display area.

According to the above configuration example, the user is able to perform intuitive move operation.

In still another configuration example, the input device may include a touch panel provided on the second display area, and the move operation may include an operation of moving a touch position while the touch panel is being touched.

According to the above configuration example, the user is able to perform intuitive move operation.

In still another configuration example, the display control program may further cause the computer to function as move operation detecting means for detecting a move operation of at least one symbol image of the one or more symbol images displayed on the second display area, based on an input from an input device, the symbol image display control means may include symbol image move means for moving the at least one symbol image of the one or more symbol images displayed on the second display area in accordance with the move operation, and the display control program may further cause the computer to function as object automatic control means for automatically moving the one or more objects, in accordance with a predetermined algorithm, and independently of current positions of the respective one or more symbol images on the second display area, while the move operation is not in progress.

According to the above configuration example, the objects in the virtual space appear more attractive, interesting the user.

In still another configuration example, the object automatic control means may automatically move the one or more objects a predetermined time after the move operation is no longer performed.

According to the above configuration example, a time period from the completion of the move operation until the object is automatically moved in accordance with the predetermined algorithm can be secured.

In still another configuration example, at a time point when the move operation is started, the object automatic control means may move the one or more objects corresponding to the respective one or more symbol images, to respective virtual space positions corresponding to the current positions of the one or more symbol images on the second display area.

According to the above configuration example, at a time point when the move operation is started, the positional relationship between the objects displayed on the first display area matches the positional relationship between the respective symbol images displayed on the second display area, and therefore the user can properly perform the move operation, while watching the first display area.

In still another configuration example, the display control program may further cause the computer to function as display scale control means for controlling a display scale of the virtual space displayed on the first display area, and when the move operation is started, the display scale control means may reduce the display scale.

According to the above configuration example, a range of the virtual space displayed on the first display area is expanded when the move operation is started, thereby allowing the user to easily understand the positional relationship between the objects.

In still another configuration example, when the move operation is ended, the display scale control means may increase the display scale.

According to the above configuration example, the display scale of the virtual space displayed on the first display area is increased when the move operation is ended, thereby allowing the user to easily understand the detail of the objects positioned in the virtual space.

In still another configuration example, the first display area and the second display area may be provided in two display devices having different display types, respectively.

In still another configuration example, the first display area may be provided in a display device which allows stereoscopic vision, and the second display area may be provided in a display device which does not allow stereoscopic vision.

In still another configuration example, the display control program may further cause the computer to function as symbol image generating means for generating a symbol image corresponding to a respective object of the one or more objects, by rendering at least a part of the respective object.

According to the above configuration example, a symbol image can be generated as necessary, which reduces the necessity of previously preparing the symbol image, and the storage area.

In still another configuration example, the symbol image display control means may place the one or more symbol images, according to the order thereof, a plurality of placement areas previously set, respectively, and displays the one or more symbol images on the second display area.

In still another configuration example, the symbol image display control means may display the plurality of placement areas on the second display area in a state which allows a user to view borders between the plurality of placement areas.

According to the above configuration example, the user can easily understand the positions of the placement areas by watching the second display area.

In still another configuration example, the symbol image display control means may display, in a list format, the one or more symbol images on the second display area, according to the order thereof.

In still another configuration example, the symbol image display control means may display, in a menu format, the one or more symbol images on the second display area, according to the order thereof.

The display control program can be stored in any computer-readable storage medium (such as flexible discs, hard disks, optical discs, magneto-optical disks, CD-ROMs, CD-Rs, magnetic tapes, semiconductor memory cards, ROMs, and RAMs).

An example of the display control apparatus of the present invention is a display control apparatus for simultaneously displaying one or more objects on a first display area, and one or more symbol images, which correspond to the one or more objects, respectively, on a second display area, the display control apparatus includes symbol image display control means for displaying the one or more symbol images on the second display area, according to an order thereof, and object display control means for placing the one or more objects, which correspond to the one or more symbol images displayed on the second display area, respectively, at predetermined positions, with which the order of the one or more symbol images is associated, in a virtual space, and displaying the one or more objects on the first display area.

An example of the display control method of the present invention is a display control method for simultaneously displaying one or more objects on a first display area, and one or more symbol images, which correspond to the one or more objects, respectively, on a second display area, the display control method includes a symbol image display control step of displaying the one or more symbol images on the second display area, according to an order thereof, and an object display control step of placing the one or more objects, which correspond to the one or more symbol images displayed on the second display area, respectively, at predetermined positions, with which the order of the one or more symbol images is associated, in a virtual space, and displaying the one or more objects on the first display area.

An example of the display control method of the present invention is a display control system for simultaneously displaying one or more objects on a first display area, and one or more symbol images, which correspond to the one or more objects, respectively, on a second display area, the display control system includes symbol image display control means for displaying the one or more symbol images on the second display area, according to an order thereof, and object display control means for placing the one or more objects, which correspond to the one or more symbol images displayed on the second display area, respectively, at predetermined positions, with which the order of the one or more symbol images is associated, in a virtual space, and displaying the one or more objects on the first display area.

According to the present invention, the positional relationship of the one or more objects can be clearly displayed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a cross-sectional view of the upper housing 21 shown in FIG. 1, taken along a line A-A';

DESCRIPTION OF THE PREFERRED EMBODIMENTS (Structure of Game Apparatus)

Figure 1:
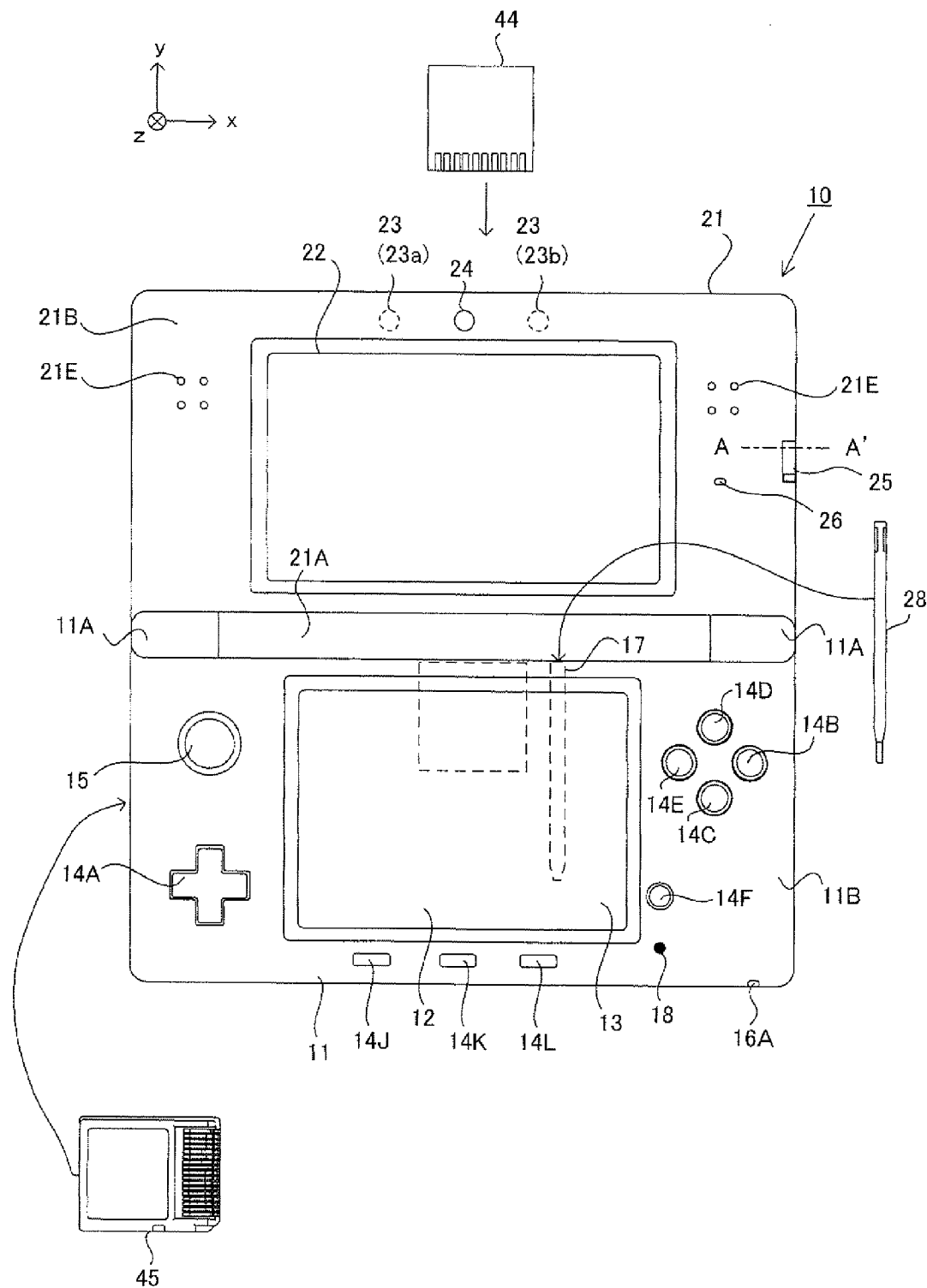
FIG. 1 is a front view of a game apparatus 10 in an opened state.
Figure 2:
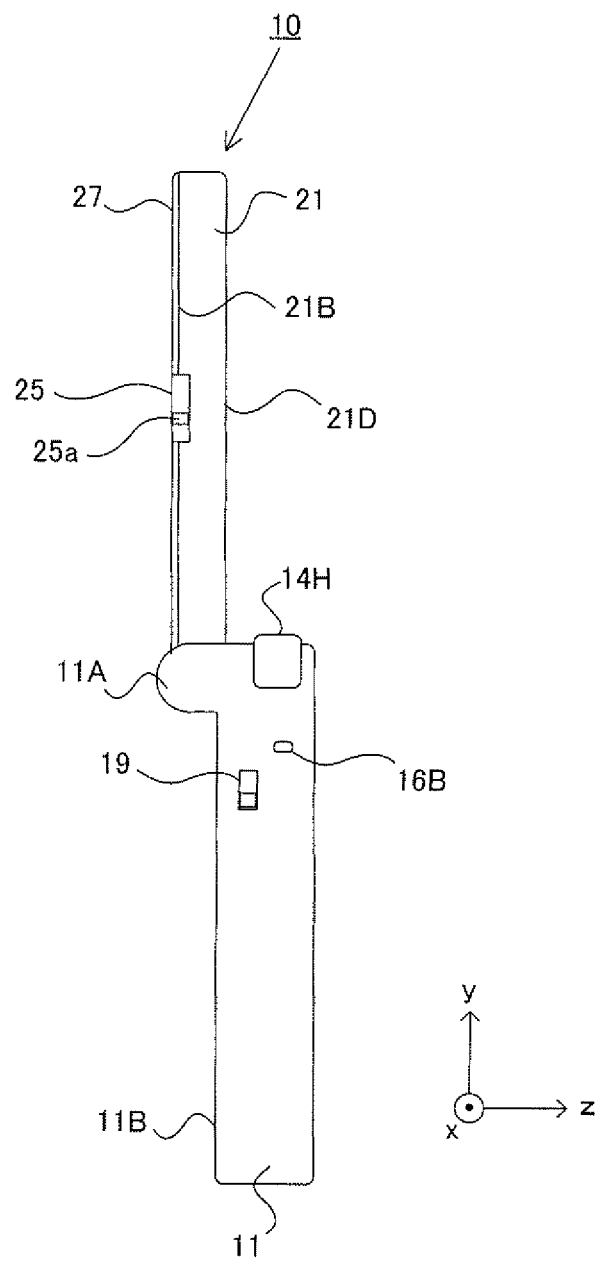
FIG. 2 is a side view of the game apparatus 10 in the opened state.
Figure 3:
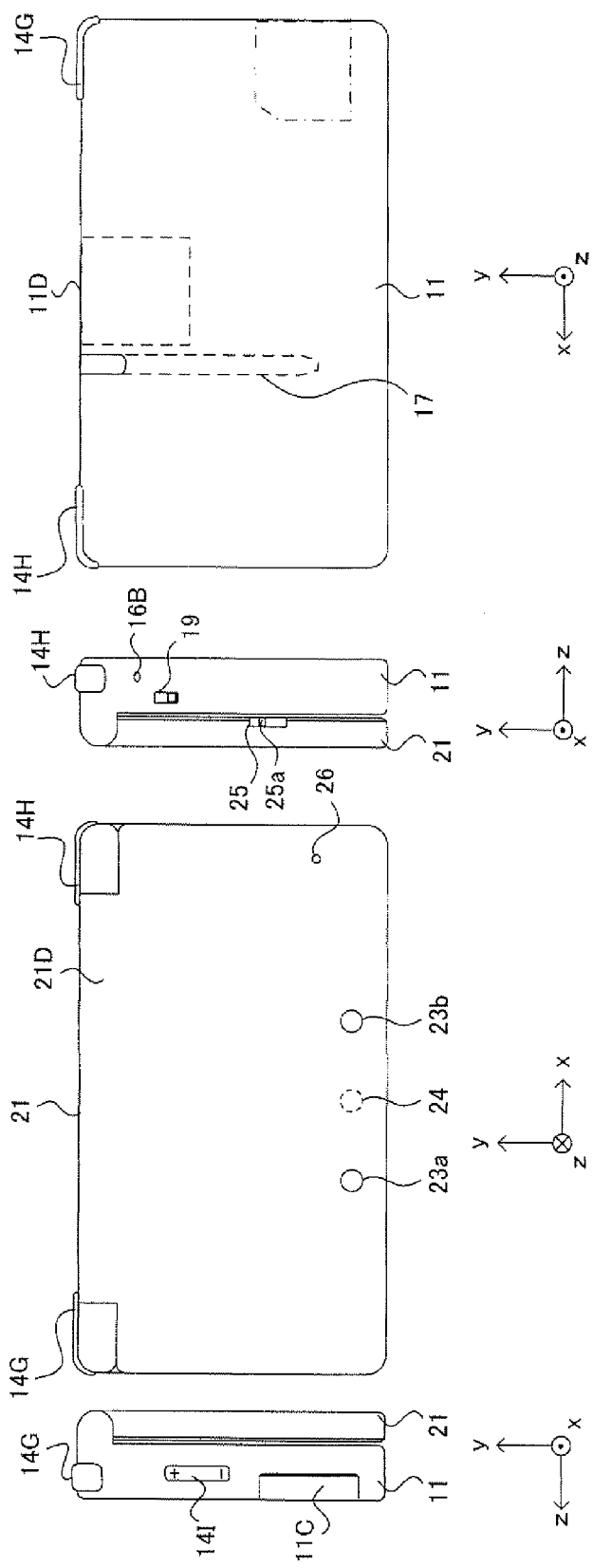
FIG. 3A is a left side view of the game apparatus 10 in a closed state.
FIG. 3B is a front view of the game apparatus 10 in the closed state.
FIG. 3C is a right side view of the game apparatus 10 in the closed state.
FIG. 3D is a rear view of the game apparatus 10 in the closed state.

Hereinafter, a game apparatus according to one embodiment of the present invention will be described. FIG. 1, FIG. 2, and FIG. 3A, FIG. 3B, FIG. 3C, and FIG. 3D are each a plan view of an outer appearance of a game apparatus 10. The game apparatus 10 is a hand-held game apparatus, and is configured to be foldable as shown in FIG. 1 to FIG. 3D. FIG. 1 and FIG. 2 show the game apparatus 10 in an opened state, and FIG. 3A to 3D shows the game apparatus 10 in a closed state. FIG. 1 is a front view of the game apparatus 10 in the opened state, and FIG. 2 is a right side view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1 to FIG. 3D. The game apparatus 10 includes a lower housing 11 and an upper housing 21 as shown in FIG. 1 to FIG. 3D. The lower housing 11 and the upper housing 21 are connected to each other so as to be openable and closable (foldable). In the present embodiment, the lower housing 11 and the upper housing 21 are each formed in a horizontally long plate-like rectangular shape, and are connected to each other at long side portions thereof so as to be pivotable with respect to each other.

As shown in FIG. 1 and FIG. 2, projections 11A each of which projects in a direction orthogonal to an inner side surface (main surface) 11B of the lower housing 11 are provided at the upper long side portion of the lower housing 11, whereas a projection 21A which projects from the lower side surface of the upper housing 21 in a direction orthogonal to the lower side surface of the upper housing 21 is provided at the lower long side portion of the upper housing 21. Since the projections 11A of the lower housing 11 and the projection 21A of the upper housing 21 are connected to each other, the lower housing 11 and the upper housing 21 are foldably connected to each other.

(Description of Lower Housing)

Initially, a structure of the lower housing 11 will be described. As shown in FIG. 1 to FIG. 3D, in the lower housing 11, a lower LCD (Liquid Crystal Display) 12, a touch panel 13, operation buttons 14A to 14L (FIG. 1, FIGS. 3A to 3D), an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11. The lower LCD 12 is provided on the inner side surface (main surface) of the lower housing 11, and a screen of the lower LCD 12 is exposed at an opening of the lower housing 11. When the game apparatus 10 is not used, the game apparatus 10 is in the closed state, thereby preventing the screen of the lower LCD 12 from becoming unclean and damaged. The number of pixels of the lower LCD 12 may be, for example, 256 dots×192 dots (the longitudinal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 3D) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape. The button 14A to 14E, the selection button 14J, the HOME button 14K, and the start button 14L are assigned functions, respectively, in accordance with a program executed by the game apparatus 10, as necessary. For example, the cross button 14A is used for a selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 in an upper portion of the inner side surface of the lower housing 11. As shown in FIG. 1, the cross button 14A is provided to the left of the lower LCD 12 in the lower portion of the lower housing 11. That is, the analog stick 15 is provided above the cross button 14A. The analog stick 15 and the cross button 14A are positioned so as to be operated by a thumb of a left hand with which the lower housing is held. Further, the analog stick 15 is provided in the upper area, and thus the analog stick 15 is positioned such that a thumb of a left hand with which the lower housing 11 is held is naturally positioned on the position of the analog stick 15, and the cross button 14A is positioned such that the thumb of the left hand is positioned on the position of the cross button 14A when the thumb of the left hand is slightly moved downward from the analog stick 15. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Four buttons, that is, the button 14B, the button 14C, the button 14D, and the button 14E, which are positioned so as to form a cross shape, are positioned such that a thumb of a right hand with which the lower housing 11 is held is naturally positioned on the positions of the four buttons. Further, the four buttons and the analog stick 15 sandwich the lower LCD 12, so as to be bilaterally symmetrical in position with respect to each other. Thus, depending on a game program, for example, a left-handed person can make a direction instruction input by using these four buttons.

Further, the microphone hole 18 is provided on the inner side surface of the lower housing 11. Under the microphone hole 18, a microphone (see FIG. 6) is provided as a sound input device described below, and the microphone detects for a sound from the outside of the game apparatus 10.

FIG. 3A is a left side view of the game apparatus 10 in the closed state. FIG. 3B is a front view of the game apparatus 10 in the closed state. FIG. 3C is a right side view of the game apparatus 10 in the closed state. FIG. 3D is a rear view of the game apparatus 10 in the closed state. As shown in FIG. 3B and FIG. 3D, an L button 14G and an R button 14H are provided on the upper side surface of the lower housing 11. The L button 14G is positioned on the left end portion of the upper side surface of the lower housing 11 and the R button 14H is positioned on the right end portion of the upper side surface of the lower housing 11. The L button 14G and the R button 14H can act, for example, as shutter buttons (imaging instruction buttons) of the imaging section. Further, as shown in FIG. 3A, a sound volume button 14I is provided on the left side surface of the lower housing 11. The sound volume button 14I is used for adjusting a sound volume of a speaker of the game apparatus 10.

As shown in FIG. 3A, a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10. The connector and the cover section 11C may be provided on the right side surface of the lower housing 11.

Further, as shown in FIG. 3D, an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10. The connector and the insertion opening 11D may be provided on another side surface (for example, the right side surface) of the lower housing 11.

Further, as shown in FIG. 1 and FIG. 3C, a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 3C).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 to FIG. 3D, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12. Further, the screen of the upper LCD 22 is horizontally elongated as compared to the screen of the lower LCD 12. Specifically, a rate of the horizontal width in the aspect ratio of the screen of the upper LCD 22 is set so as to be greater than a rate of the horizontal width in the aspect ratio of the screen of the lower LCD 12.

The screen of the upper LCD 22 is provided on the inner side surface (main surface) 21B of the upper housing 21, and the screen of the upper LCD 22 is exposed at an opening of the upper housing 21. Further, as shown in FIG. 2, the inner side surface of the upper housing 21 is covered with a transparent screen cover 27. The screen cover 27 protects the screen of the upper LCD 22, and integrates the upper LCD 22 and the inner side surface of the upper housing 21 with each other, thereby achieving unity. The number of pixels of the upper LCD 22 may be, for example, 640 dots×200 dots (the horizontal line×the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye are alternately displayed for a predetermined time period may be used. Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. Further, these imaging sections are each designed so as to be positioned in a direction which is opposite to the normal direction of the display surface (inner side surface) of the upper LCD 22 by 180 degrees. Specifically, the imaging direction of the outer imaging section (left) 23a and the imaging direction of the outer imaging section (right) 23b are parallel to each other. The outer imaging section (left) 23a and the outer imaging section (right) 23b can be used as a stereo camera depending on a program executed by the game apparatus 10. Further, depending on a program, when any one of the two outer imaging sections (23a and 23b) is used alone, the outer imaging section 23 may be used as a non-stereo camera. Further, depending on a program, images taken by the two outer imaging sections (23a and 23b) may be combined with each other or may compensate for each other, thereby enabling imaging using an extended imaging range. In the present embodiment, the outer imaging section 23 is structured so as to include two imaging sections, that is, the outer imaging section (left) 23a and the outer imaging section (right) 23b. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

As indicated by dashed lines in FIG. 1 and by solid lines in FIG. 3B, the outer imaging section (left) 23a and the outer imaging section (right) 23b forming the outer imaging section 23 are aligned so as to be parallel to the horizontal direction of the screen of the upper LCD 22. Specifically, the outer imaging section (left) 23a and the outer imaging section (right) 23b are positioned such that a straight line connecting between the two imaging sections is parallel to the horizontal direction of the screen of the upper LCD 22. Reference numerals 23a and 23b which are indicated as dashed lines in FIG. 1 represent the outer imaging section (left) 23a and the outer imaging section (right) 23b, respectively, which are positioned on the outer side surface reverse of the inner side surface of the upper housing 21. As shown in FIG. 1, when a user views the screen of the upper LCD 22 from the front thereof, the outer imaging section (left) 23a is positioned to the left of the upper LCD 22 and the outer imaging section (right) 23b is positioned to the right of the upper LCD 22. When a program for causing the outer imaging section 23 to function as a stereo camera is executed, the outer imaging section (left) 23a takes an image for a left eye, which is viewed by a left eye of a user, and the outer imaging section (right) 23b takes an image for a right eye, which is viewed by a right eye of the user. A distance between the outer imaging section (left) 23a and the outer imaging section (right) 23b is set so as to be approximately the same as a distance between both eyes of a person, that is, may be set so as to be within a range from 30 mm to 70 mm, for example. However, the distance between the outer imaging section (left) 23a and the outer imaging section (right) 23b is not limited to a distance within the range described above.

In the present embodiment, the outer imaging section (left) 23a and the outer imaging section (right) 23b are secured to the housing, and the imaging directions thereof cannot be changed.

Further, the outer imaging section (left) 23a and the outer imaging section (right) 23b are positioned to the left and to the right, respectively, of the upper LCD 22 (on the left side and the right side, respectively, of the upper housing 21) so as to be horizontally symmetrical with respect to the center of the upper LCD 22. Specifically, the outer imaging section (left) 23a and the outer imaging section (right) 23b are positioned so as to be symmetrical with respect to a line which divides the upper LCD 22 into two equal parts, that is, the left part and the right part. Further, the outer imaging section (left) 23a and the outer imaging section (right) 23b are positioned at positions which are reverse of positions above the upper edge of the screen of the upper LCD 22 and which are on the upper portion of the upper housing 21 in an opened state. Specifically, when the upper LCD 22 is projected on the outer side surface of the upper housing 21, the outer imaging section (left) 23a and the outer imaging section (right) 23b are positioned, on the outer side surface of the upper housing 21, at a position above the upper edge of the screen of the upper LCD 22 having been projected.

As described above, the two imaging sections (23a and 23b) of the outer imaging section 23 are positioned to the left and the right of the upper LCD 22 so as to be horizontally symmetrical with respect to the center of the upper LCD 22. Therefore, when a user views the upper LCD 22 from the front thereof, the imaging direction of the outer imaging section 23 can be the same as the direction of the line of sight of the user. Further, the outer imaging section 23 is positioned at a position reverse of a position above the upper edge of the screen of the upper LCD 22. Therefore, the outer imaging section 23 and the upper LCD 22 do not interfere with each other inside the upper housing 21. Therefore, the upper housing 21 may have a reduced thickness as compared to a case where the outer imaging section 23 is positioned on a position reverse of a position of the screen of the upper LCD 22.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

As shown in FIG. 1, when the upper housing 21 is in the opened state, the inner imaging section 24 is positioned, on the upper portion of the upper housing 21, above the upper edge of the screen of the upper LCD 22. Further, in this state, the inner imaging section 24 is positioned at the horizontal center of the upper housing 21 (on a line which separates the upper housing 21 (the screen of the upper LCD 22) into two equal parts, that is, the left part and the right part). Specifically, as shown in FIG. 1 and FIG. 3B, the inner imaging section 24 is positioned on the inner side surface of the upper housing 21 at a position reverse of the middle position between the left and the right imaging sections (the outer imaging section (left) 23a and the outer imaging section (right) 23b) of the outer imaging section 23. Specifically, when the left and the right imaging sections of the outer imaging section 23 provided on the outer side surface of the upper housing 21 are projected on the inner side surface of the upper housing 21, the inner imaging section 24 is positioned at the middle position between the left and the right imaging sections having been projected. The dashed line 24 indicated in FIG. 3B represents the inner imaging section 24 positioned on the inner side surface of the upper housing 21.

As described above, the inner imaging section 24 is used for taking an image in the direction opposite to that of the outer imaging section 23. The inner imaging section 24 is positioned on the inner side surface of the upper housing 21 at a position reverse of the middle position between the left and the right imaging sections of the outer imaging section 23. Thus, when a user views the upper LCD 22 from the front thereof, the inner imaging section 24 can take an image of a face of the user from the front thereof. Further, the left and the right imaging sections of the outer imaging section 23 do not interfere with the inner imaging section 24 inside the upper housing 21, thereby enabling reduction of the thickness of the upper housing 21.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. As shown in FIG. 1 to FIG. 3D, the 3D adjustment switch 25 is provided at the end portions of the inner side surface and the right side surface of the upper housing 21, and is positioned at a position at which the 3D adjustment switch 25 is visible to a user when the user views the upper LCD 22 from the front thereof. Further, an operation section of the 3D adjustment switch 25 projects on the inner side surface and the right side surface, and can be viewed and operated from both sides. All the switches other than the 3D adjustment switch 25 are provided on the lower housing 11.

FIG. 4 is a cross-sectional view of the upper housing 21 shown in FIG. 1 taken along a line A-A'. As shown in FIG. 4, a recessed portion 21C is formed at the right end portion of the inner side surface of the upper housing 21, and the 3D adjustment switch 25 is provided in the recessed portion 21C. The 3D adjustment switch 25 is provided so as to be visible from the front surface and the right side surface of the upper housing 21 as shown in FIG. 1 and FIG. 2. A slider 25a of the 3D adjustment switch 25 is slidable to any position in a predetermined direction (along the longitudinal direction of the right side surface), and a display mode of the upper LCD 22 is determined in accordance with the position of the slider 25a.

Figure 5A:
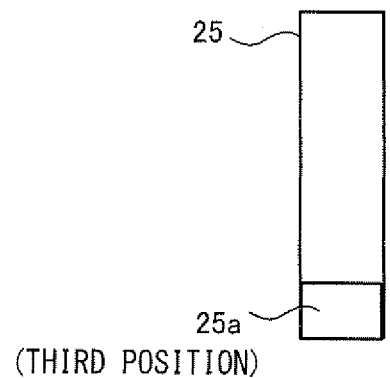
FIG. 5A is a diagram illustrating a state in which a slider 25a of a 3D adjustment switch 25 is positioned at a lowermost position (a third position)
Figure 5B:
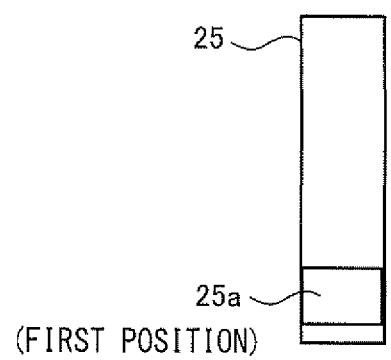
FIG. 5B is a diagram illustrating a state in which the slider 25a of the 3D adjustment switch 25 is positioned above the lowermost position (a first position)
Figure 5C:
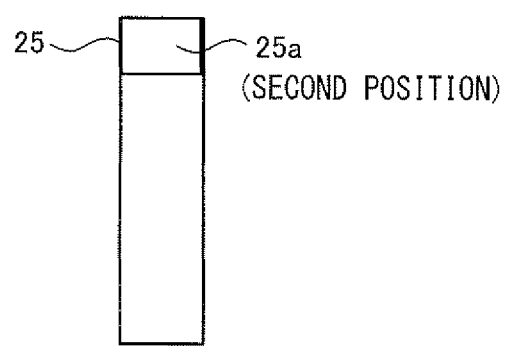
FIG. 5C is a diagram illustrating a state in which the slider 25a of the 3D adjustment switch 25 is positioned at an uppermost position (a second position)

FIG. 5A to FIG. 5C are each a diagram illustrating a state in which the slider 25a of the 3D adjustment switch 25 slides. FIG. 5A is a diagram illustrating a state in which the slider 25a of the 3D adjustment switch 25 is positioned at the lowermost position (a third position). FIG. 5B is a diagram illustrating a state in which the slider 25a of the 3D adjustment switch 25 is positioned above the lowermost position (a first position). FIG. 5C is a diagram illustrating a state in which the slider 25a of the 3D adjustment switch 25 is positioned at the uppermost position (a second position).

As shown in FIG. 5A, when the slider 25a of the 3D adjustment switch 25 is positioned at the lowermost position (the third position), the upper LCD 22 is set to the planar display mode, and a planar image is displayed on the screen of the upper LCD 22 (the upper LCD 22 may remain set to the stereoscopic display mode, and the same image may be used for the image for a left eye and the image for a right eye, to perform planar display). On the other hand, when the slider 25a is positioned between a position shown in FIG. 6B (a position (first position) above the lowermost position) and a position shown in FIG. 6C (the uppermost position (the second position)), the upper LCD 22 is set to the stereoscopic display mode. In this case, a stereoscopically visible image is displayed on the screen of the upper LCD 22. When the slider 25a is positioned between the first position and the second position, a manner in which the stereoscopic image is visible is adjusted in accordance with the position of the slider 25a. Specifically, an amount of deviation in the horizontal direction between a position of an image for a right eye and a position of an image for a left eye is adjusted in accordance with the position of the slider 25a. The slider 25a of the 3D adjustment switch 25 is configured so as to be fixed at the third position, and is slidable, along the longitudinal direction of the right side surface, to any position between the first position and the second position. For example, the slider 25a is fixed at the third position by a projection (not shown) which projects, from the side surface of the 3D adjustment switch 25, in the lateral direction shown in FIG. 5A, and does not slide upward from the third position unless a predetermined force or a force greater than the predetermined force is applied upward. When the slider 25a is positioned between the third position and the first position, the manner in which the stereoscopic image is visible is not adjusted, which is intended as a margin. In another embodiment, the third position and the first position may be the same position, and, in this case, no margin is provided. Further, the third position may be provided between the first position and the second position. In this case, a direction in which an amount of deviation in the horizontal direction between a position of an image for a right eye and a position of an image for a left eye is adjusted when the slider is moved from the third position toward the first position, is opposite to a direction in which an amount of deviation in the horizontal direction between the position of the image for the right eye and the position of the image for the left eye is adjusted when the slider is moved from the third position toward the second position.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopically visible image is performed (namely, image processing in which an image for a left eye is different from an image for a right eye is performed in the case of the 3D adjustment switch being positioned between the first position and the second position) in a state where the upper LCD 22 is in the stereoscopic display mode. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 43 described below.

(Internal Configuration of Game Apparatus 10)

Figure 6:
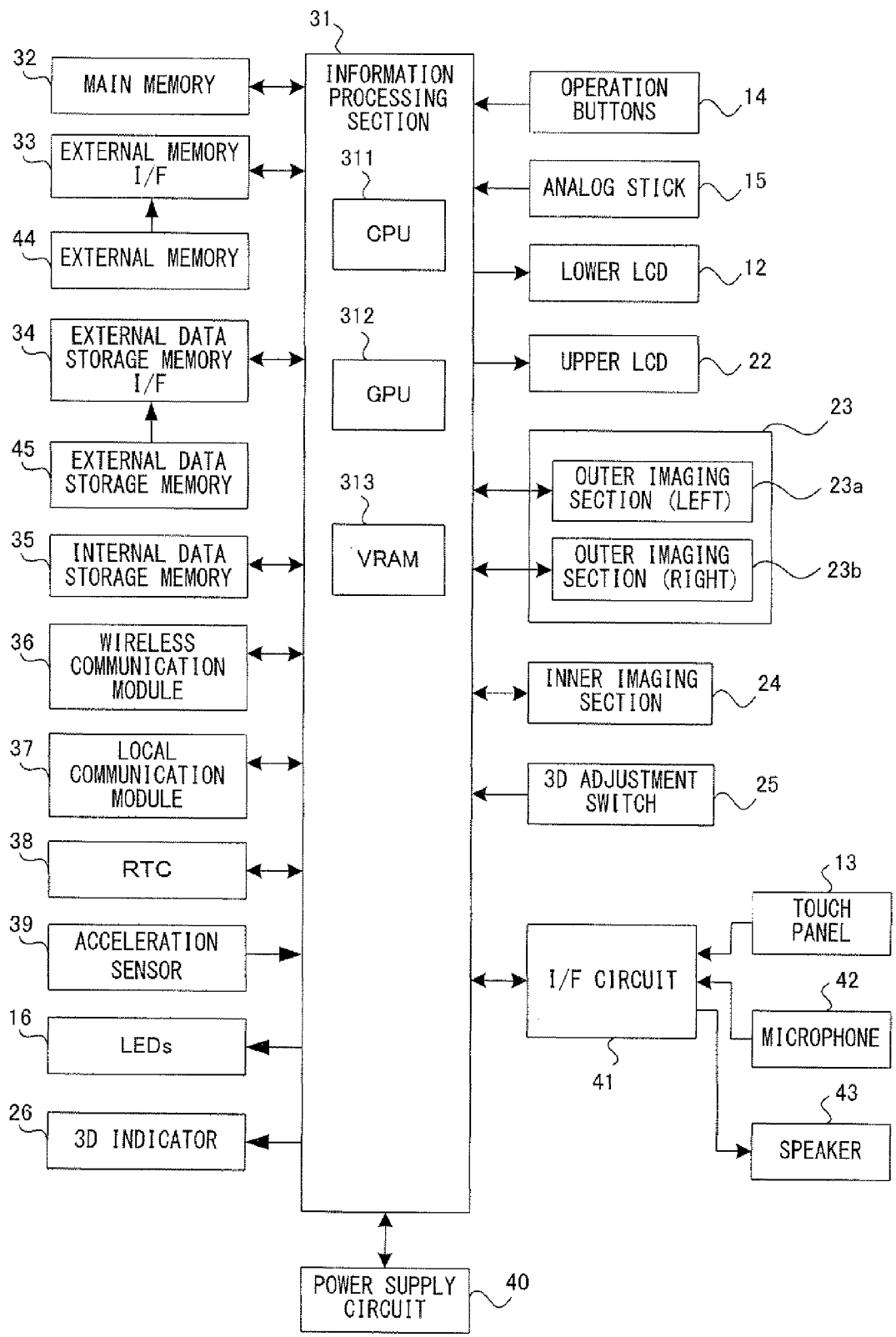
FIG. 6 is a block diagram illustrating an internal configuration of the game apparatus 10.

Next, an internal electrical configuration of the game apparatus 10 will be described with reference to FIG. 6. FIG. 6 is a block diagram illustrating an internal configuration of the game apparatus 10. As shown in FIG. 6, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory 44 connected to the external memory I/F 33 or the internal data storage memory 35) inside the game apparatus 10, thereby executing a process according to the program. The program executed by the CPU 311 of the information processing section 31 may be acquired from another device through communication with another device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the process based on the program, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, communication through a unique protocol or infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the lower LCD 12 to display a stereoscopic image (stereoscopically visible image).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye, which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22 so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode. The game apparatus 10 has the internal configuration as described above.

(Outline of Operation Performed by Game Apparatus 10)

Hereinafter, an outline of an operation performed by the game apparatus 10 in the present embodiment will be described. In the present embodiment, a display control process is performed to display an object placed in the virtual space and a symbol image corresponding to the object on the screen of the upper LCD 22 and the screen of the lower LCD 12, respectively. The display control process is executed by the CPU 311, based on a display control program described below. In the following description, the screen of the upper LCD 22 may simply be called as an "upper screen", and the screen of the lower LCD 12 may simply be called as a "lower screen".

In the internal data storage memory 35 of the game apparatus 10, information relating to one or more objects representing a human, which is created by the user, is stored as object data. The object is created by the user, for example, making an input of a nickname, performing selection of a gender, or selection of parts (such as contour, body shape, eyes, nose, lips, eyebrows, and hair style). The object can be used as, for example, a player character which is operated by a player in a game, or a non-player character which is automatically operated by the computer. A three dimensional polygon model (3D object), which corresponds to the object, can be generated based on the object data stored in the internal data storage memory 35, and placed in the virtual space, and thereby the object can be realistically represented. Not only can the object (the object data) be created by the user, but also acquired from another game apparatus or a server device through communication.

Figure 7:
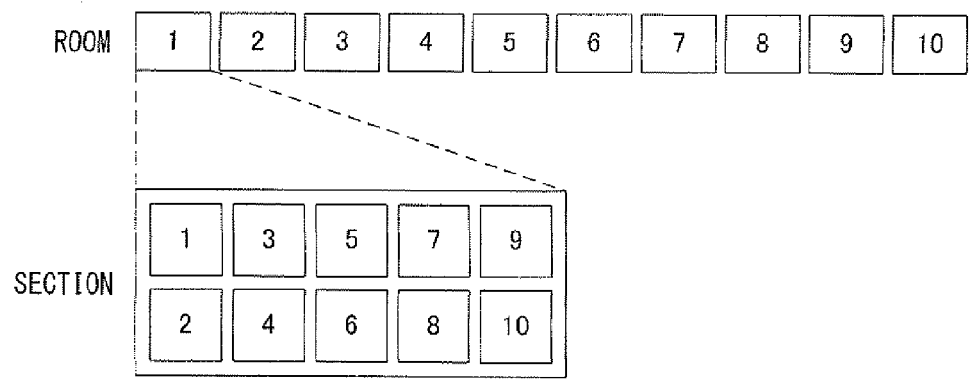
FIG. 7 is a diagram illustrating a relationship between a room and placement areas.

In the present embodiment, the internal data storage memory 35 is capable of storing therein up to 100 objects. By giving the game apparatus 10 an instruction for executing the display control process, the user can cause the object stored in the internal data storage memory 35 to be verified by displaying on the upper screen. If too many objects are simultaneously displayed on the upper screen, it makes the user difficult to discriminate the objects from one another. Therefore, in the present embodiment, ten virtual rooms are provided in each of which up to ten objects are placed, and merely objects placed in either one of the rooms are displayed on the upper screen. As shown in FIG. 7, each room is further divided into ten sections in each of which one object is assigned.

Figure 8:
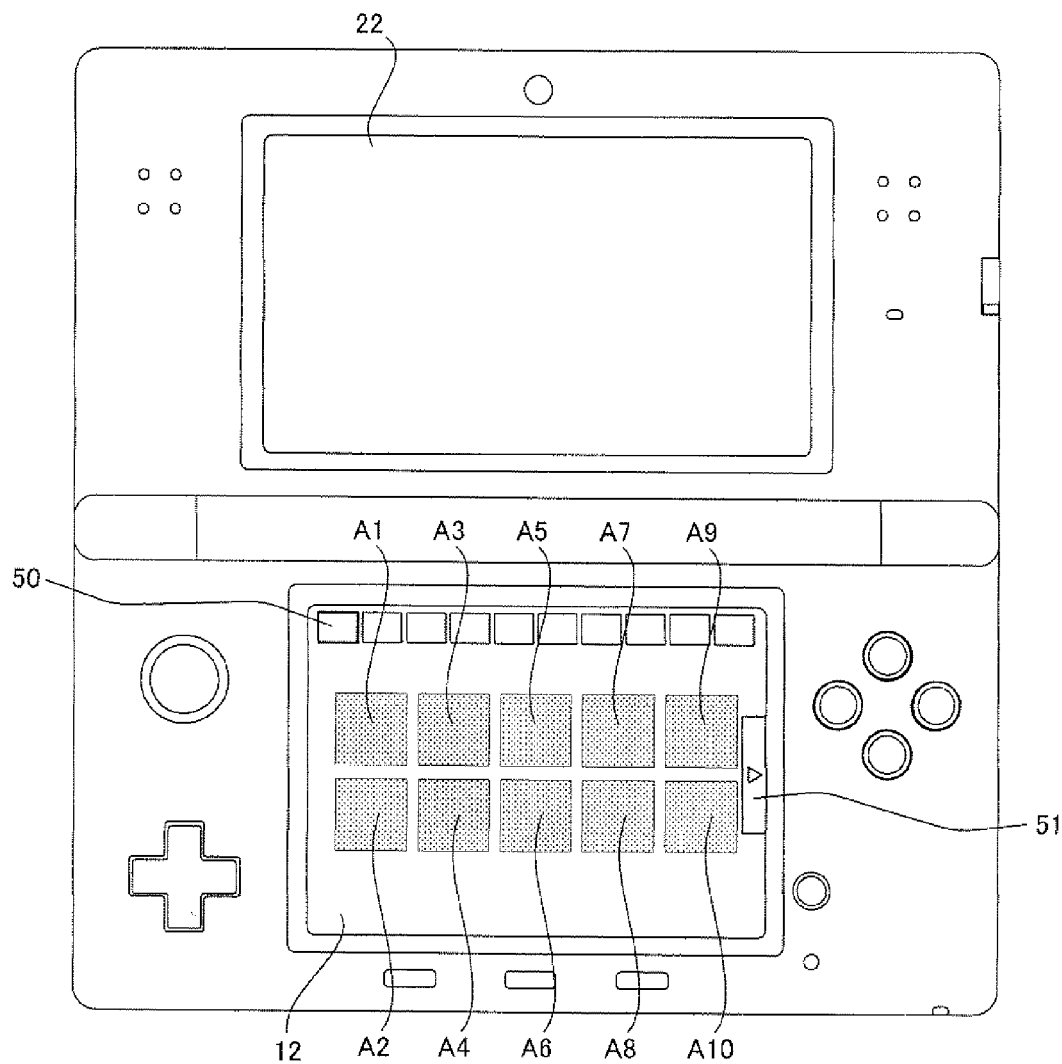
FIG. 8 is a diagram illustrating an example of an image displayed in a state in which icons are not placed in the placement areas.

FIG. 8 shows an example of images displayed on the upper screen and the lower screen, respectively, at the execution of the display control process, providing a state in which no object is stored in the internal data storage memory 35.

In FIG. 8, on the upper screen, a view of either one of the ten rooms is displayed. On the lower screen, room icons 50, placement areas A1, A2, A3, A4, A5, A6, A7, A8, A9, and A10, and a room change icon 51 are displayed.

The room icons 50 show respective statuses of the ten rooms (which section in each room the object is placed), and indicates which room is currently displayed on the upper screen. The room icons 50 also function as switches used by the user to change the room displayed on the upper screen.

The placement areas A1 through A10 correspond to the ten sections shown in FIG. 7, respectively, and are areas in which icons corresponding to the objects are placed, respectively. When the object is placed in any of the sections of the room displayed on the upper screen, the icon corresponding to the object is displayed in the placement area which corresponds to the section.

The room change icon 51 functions as a switch for changing the room displayed on the upper screen. If the user touches the room change icon 51, the room displayed on the upper screen changes to an adjacent room.

Figure 9:
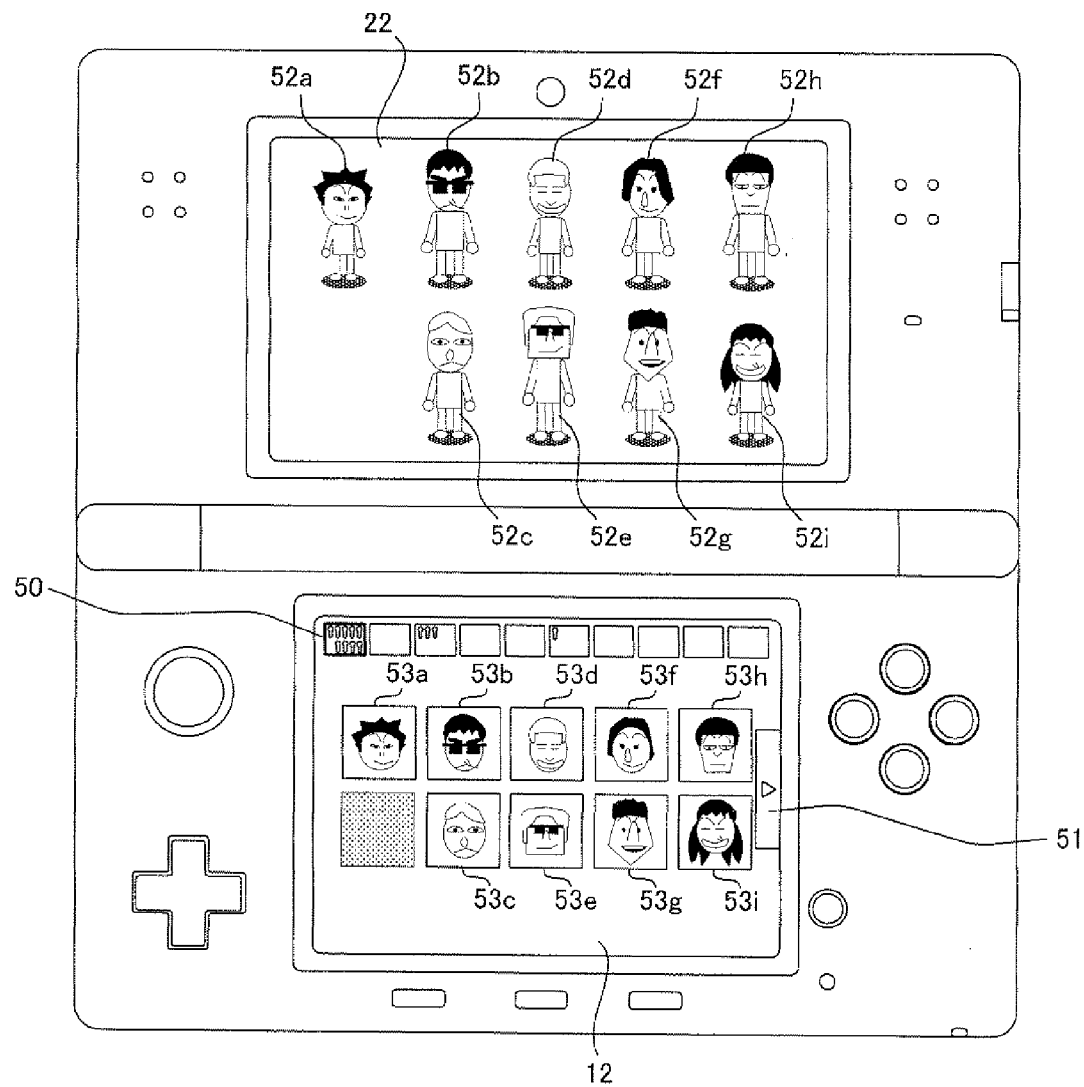
FIG. 9 is a diagram illustrating an example of an image displayed in a state in which the icons are placed in the placement areas.

FIG. 9 shows an example of images displayed on the upper screen and the lower screen, respectively, when a plurality of objects are stored in the internal data storage memory 35. In FIG. 9, on the upper screen, a view of a first room is displayed, and nine objects (52a, 52b, 52c, 52d, 52e, 52f, 52g, 52h, and 52i), which are placed in the first room, are displayed.

In FIG. 9, the room icons 50 on the lower screen indicate that the objects are placed in a first section and a third through a tenth sections of the first room, a first through a third sections of a third room, and a first section of a sixth room. The room icons 50 further indicate that the first room is currently displayed on the upper screen.

In FIG. 9, an icon 53a corresponding to the object 52a is displayed in the placement area A1 (see FIG. 8) on the lower screen, an icon 53b corresponding to the object 52b is displayed in the placement area A3. Because of this, the user can easily understand that the object 52a is placed in the first section of the first room, and the object 52b is placed in the third section of the first room. In the similar manner, the user can also easily understand that which section of the first room the objects 52c through 52i are placed, based on positions at which icons 53c, 53d, 53e, 53f, 53g, 53h, and 53i are displayed.

Next, referring to FIG. 10 and FIG. 11, a method of generating an image displayed on the upper screen will be described.

Figure 10:
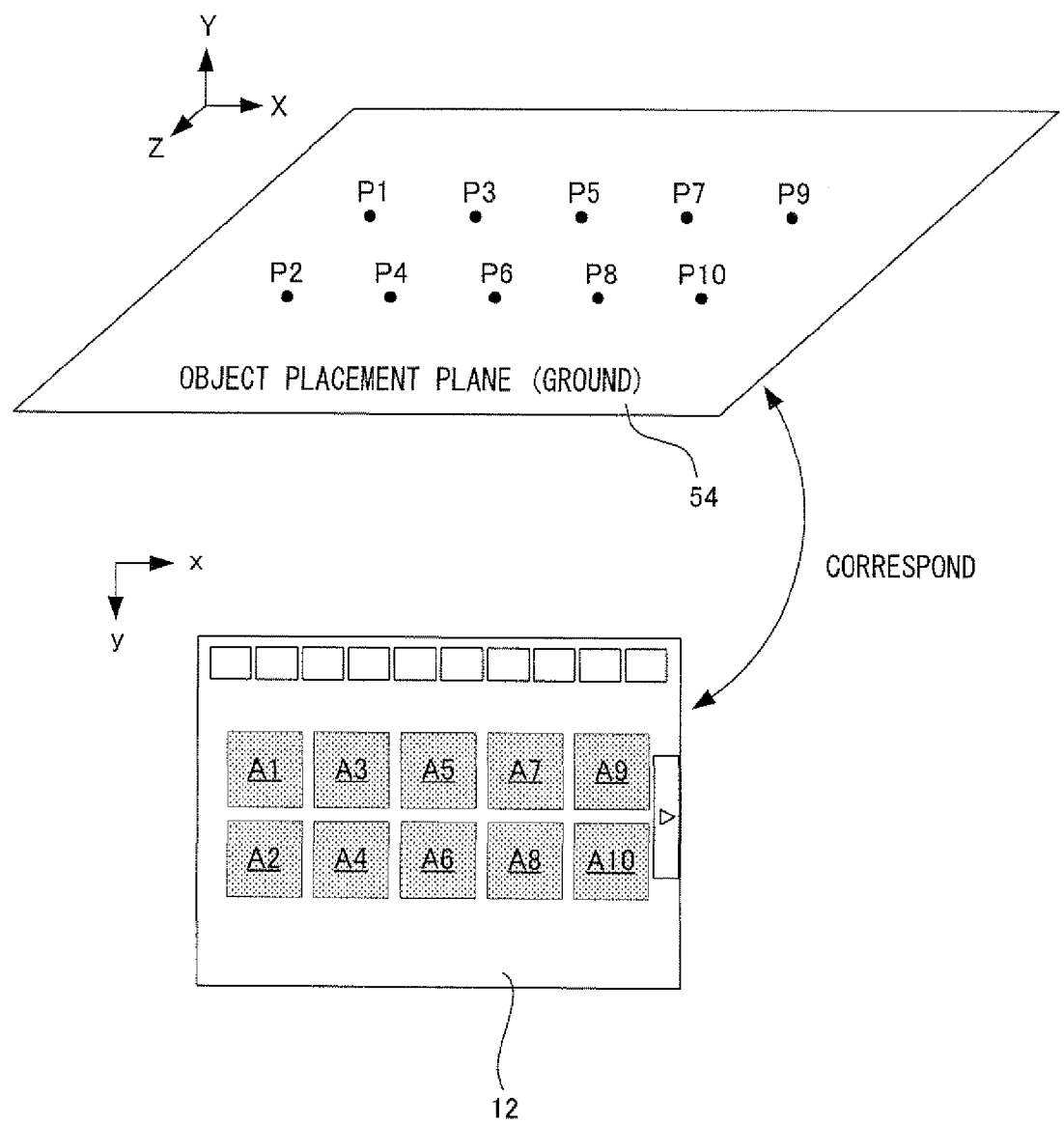
FIG. 10 is a diagram illustrating respective positions in the virtual space which correspond to the placement areas on a lower LCD 12.

As shown in FIG. 10, the placement areas A1 through A10 on the lower screen correspond to positions P1 through P10 in the virtual space, respectively. In the present embodiment, as an example, the positions P1 through P10 in the virtual space are set on an object placement plane 54 in the virtual space (which corresponds to a ground in the virtual space).

Figure 11:
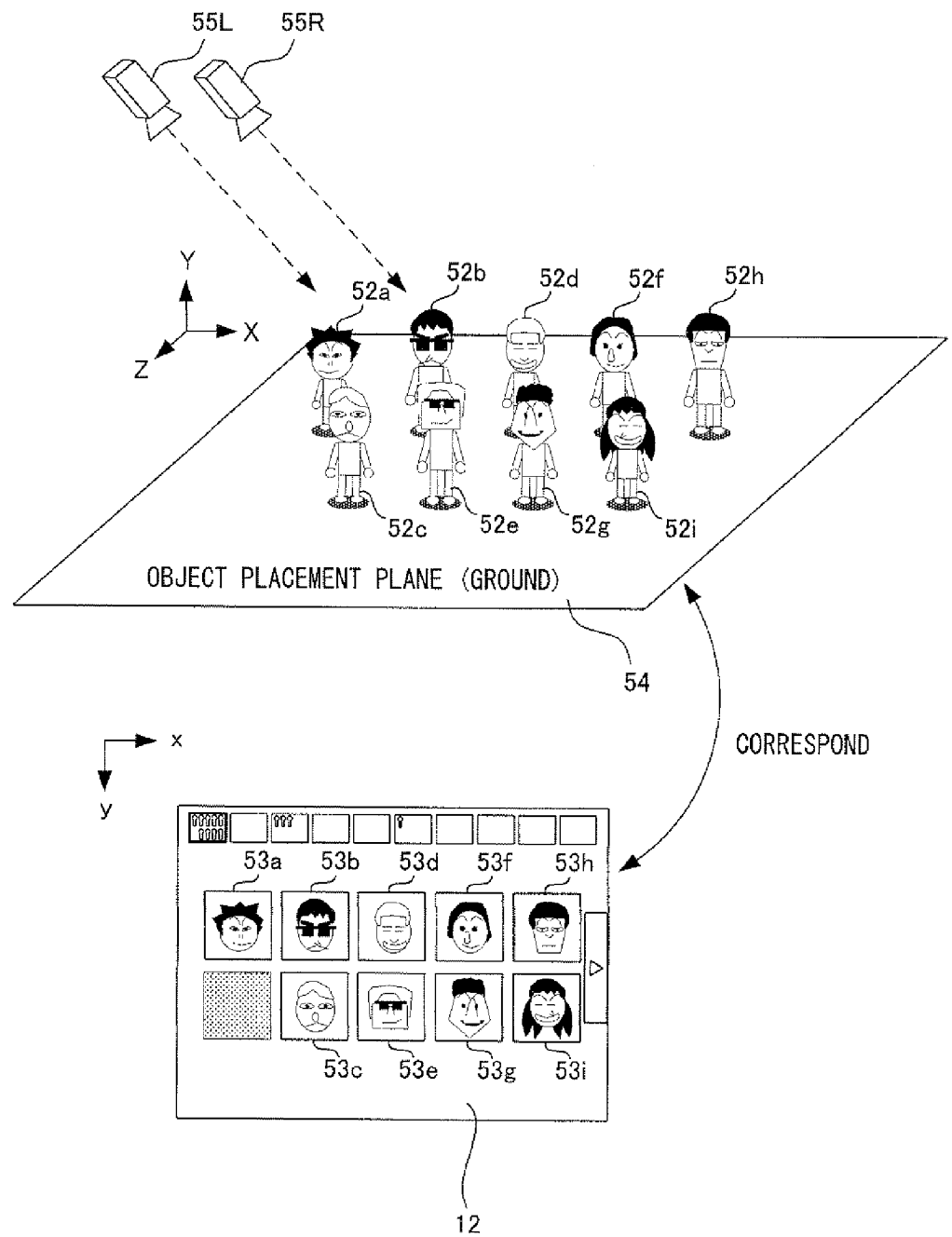
FIG. 11 is a diagram illustrating a method of generating an image to be displayed on an upper LCD 22.

On the basis of the correspondence between the placement areas A1 through A10 and the positions P1 through P10 in the virtual space as shown in FIG. 10, the objects 52a through 52i are placed on the object placement plane 54 as shown in FIG. 11. A pair of virtual cameras (a right virtual camera 55R and a left virtual camera 55L) is each arranged at a position from which the objects 52a through 52i are obliquely looked down. The objects 52a through 52i are rendered based on the right virtual camera 55R, and thereby the image for the right eye is obtained. The objects 52a through 52i are rendered based on the left virtual camera 55L, and thereby the image for the left eye is obtained. On the basis of the image for the right eye and the image for the left eye, the stereoscopically visible image is displayed on the upper screen.

In the present embodiment, as described above, at a time immediately after the display control program is started, the object is placed on the lower screen, where the icon to which the object corresponds is placed, at the position in the virtual space, which corresponds to the placement area. However, if a predetermined time has elapsed without performing a move operation described below, the objects in the virtual space start moving freely as shown in FIG. 12.

(Select Operation)

Next, referring to FIG. 13, the selection operation will be described. In the selection operation, the user selects an object, which is desired by the user, from the plurality of objects. In the present embodiment, the selection operation is performed by the user touching an icon corresponding to the desired object.

Figure 12:
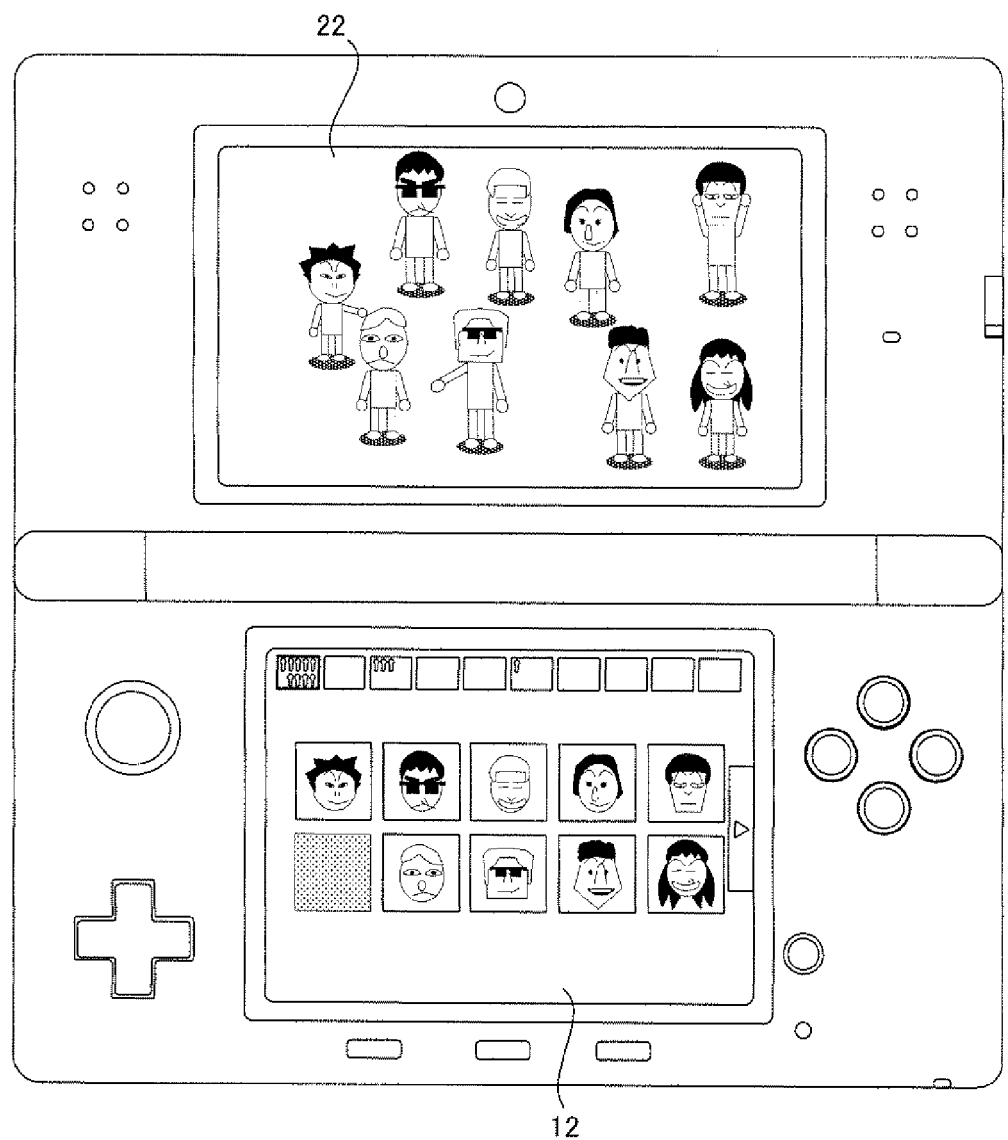
FIG. 12 is a diagram illustrating an example of images displayed when a move operation is not performed.
Figure 13:
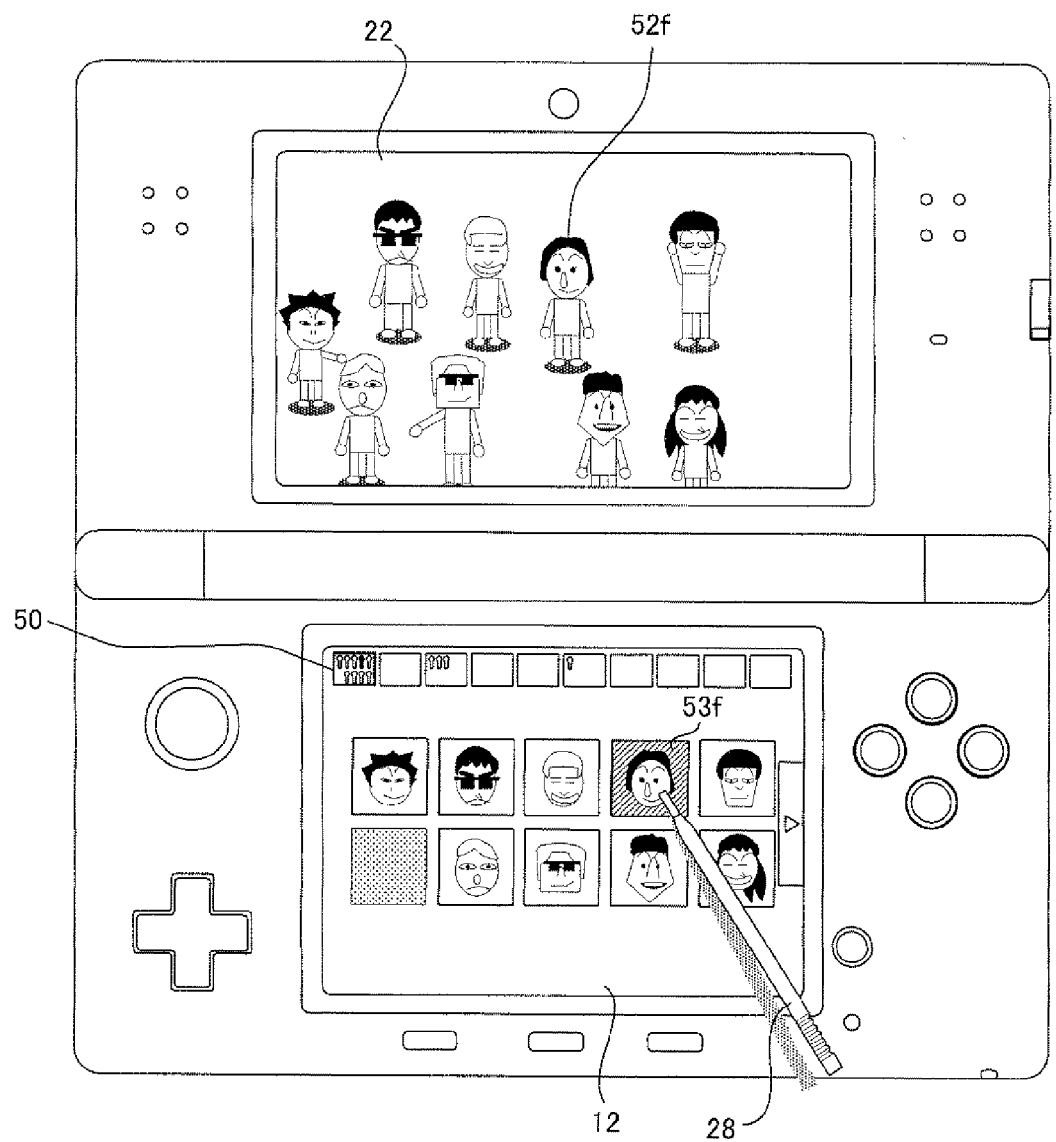
FIG. 13 is a diagram illustrating an example of images displayed when a selection operation is performed.

FIG. 13 shows an example of images displayed on the upper screen and the lower screen when the user uses the touch pen 28 to touch the icon 53f at the state shown in FIG. 12. If the user touches the icon 53f, a display state of the icon 53f changes. For example, the background color of the icon 53f turns red. In addition, on the upper screen, a display range in the virtual space shifts (that is, the right virtual camera 55R and the left virtual camera 55L move or incline) so that the object 52f corresponding to the touched icon 53f is displayed at the center of the screen (or becomes close to the center of the screen). Therefore, the user can cause the desired object to be displayed at a position, on the upper screen, where it is easily visible to the user, thereby observing the object. When any of the objects is selected, information such as a nickname of the object may be displayed on the lower screen so as to be overlapped on the selected object. In the present embodiment, even if the user moves the touch pen 28 away from the icon 53f, the object 52f corresponding to the icon 53f remains selected until the user touches another icon.

(Enlargement Operation)

Figure 14:
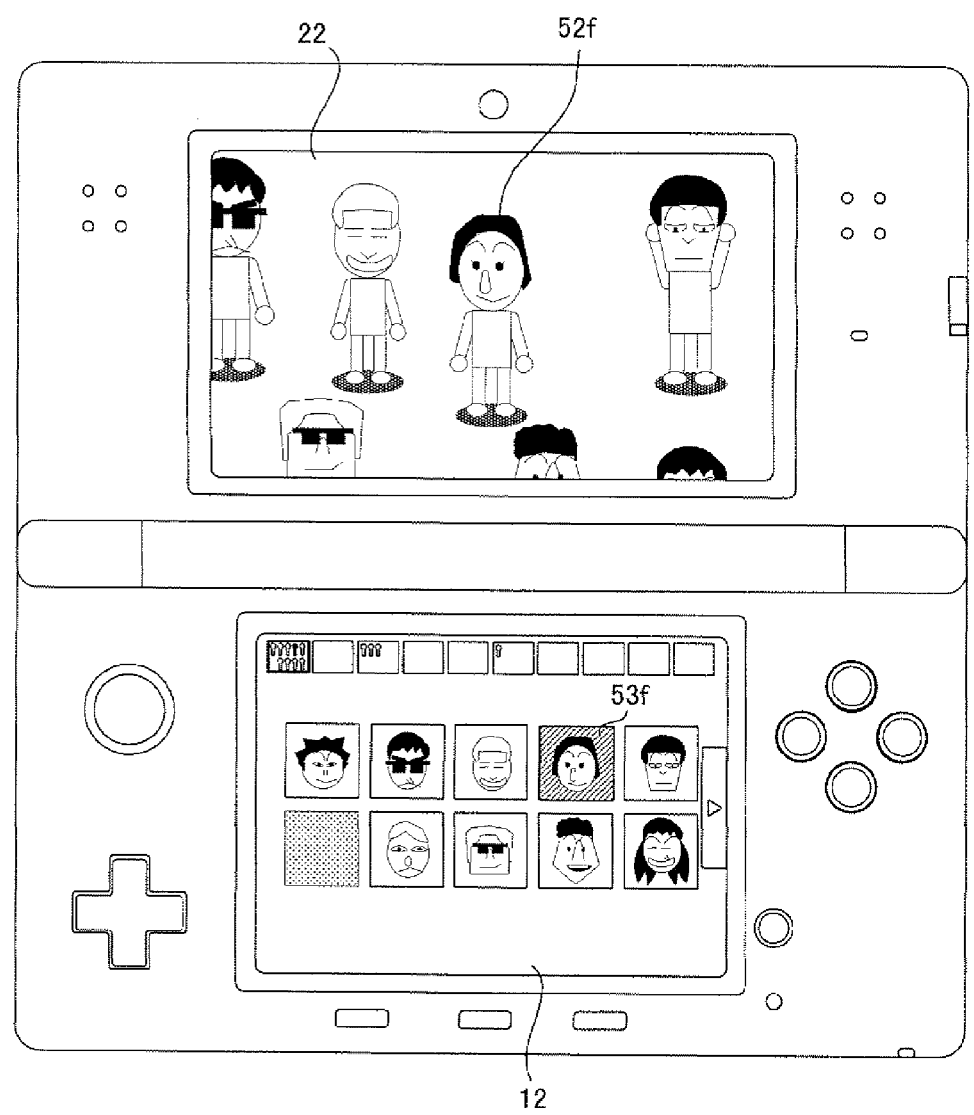
FIG. 14 is a diagram illustrating an example of images displayed when zoom-in operation is performed.

The user can display the image on the upper screen in an enlarged manner, or cancel the enlarged display by operating the cross button 14A. Specifically, when the user uses the cross button 14A to indicate the upward direction, the image on the upper screen is zoomed in (that is, the right virtual camera 55R and the left virtual camera 55L moves in the front direction thereof, or the angle of view of each of the right virtual camera 55R and the left virtual camera 55L becomes narrow). Thereafter, the user uses the cross button 14A to indicate the downward direction, and thereby the zoomed-in state is cancelled, which returns the display scale to an original scale (that is, the positions of the right virtual camera 55R and the left virtual camera 55L return to original positions, or the angle of view of each of the right virtual camera 55R and the left virtual camera 55L returns to original). FIG. 14 shows an example of images displayed on the upper screen and the lower screen when the user uses the touch pen 28 to indicate the upward direction at the state shown in FIG. 13. As a result, the user can verify the object in detail on the upper screen.

(Move Operation)

Next, referring to FIG. 15, the move operation will be described. The move operation is performed to change a section in which the desired object is currently placed. In the present embodiment, the user drags the icon corresponding to the desired object, (that is, touches the icon and then shifts the touch position while touching the touch panel 13), thereby performing the move operation.

Figure 15:
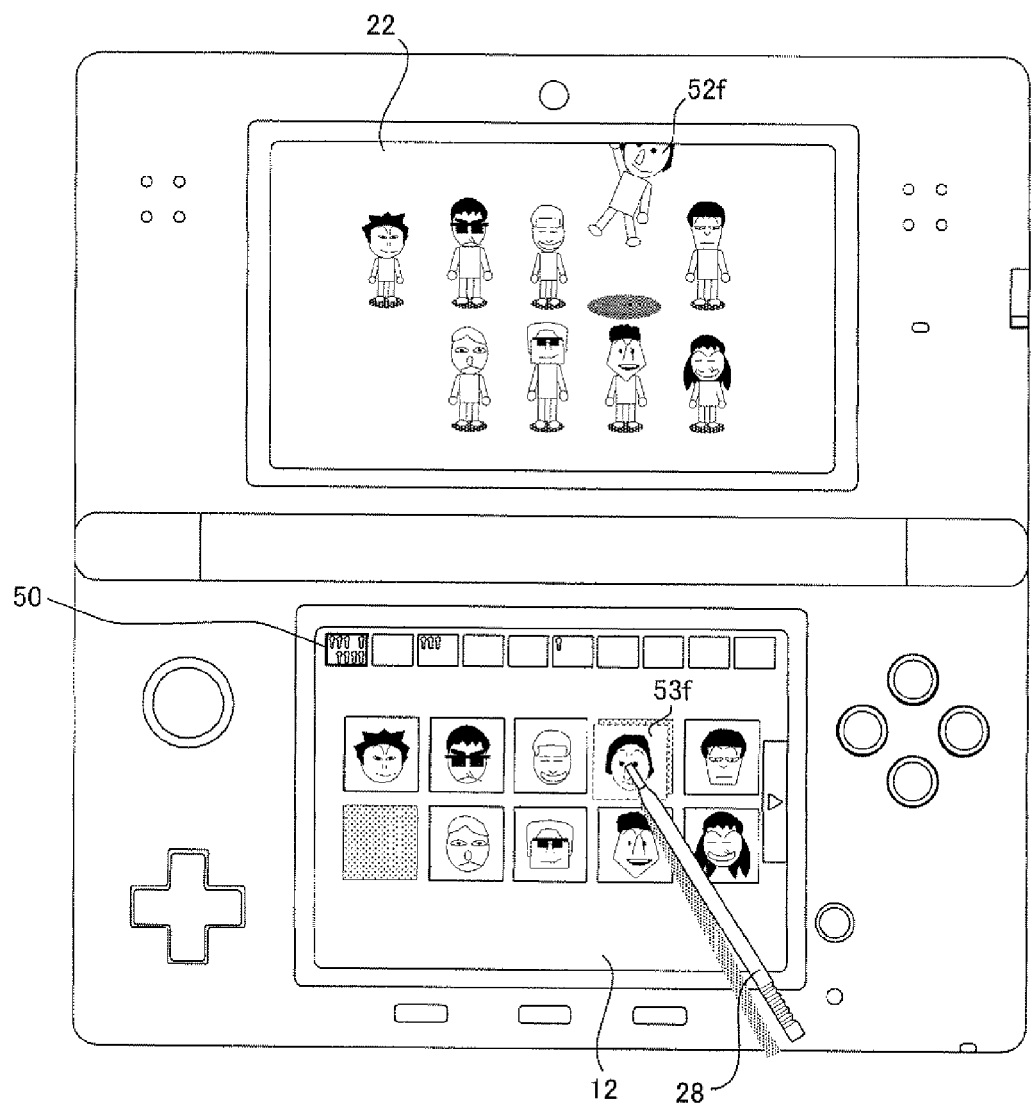
FIG. 15 is a diagram illustrating an example of images displayed while the move operation is in progress.

FIG. 15 shows an example of images displayed on the upper screen and the lower screen immediately after the user has started dragging the icon 53f at the state shown in FIG.

13. If the user drags the icon 53*f*, the display state of the icon 53*f* changes. For example, the icon 53*f* turns translucent. In addition, the other objects placed in the virtual space move to their original positions (that is, the positions P1 through P10 in the virtual space which correspond to the placement areas A1 through A10, respectively), and the image on the upper screen is zoomed out (that is, the right virtual camera 55R and the left virtual camera 55L move rearward, or the angle of view of each of the right virtual camera 55R and the left virtual camera 55L expands). Furthermore, the object 52*f* corresponding to the icon 53*f* being dragged ascends away from the ground in the virtual space, and the object 52*f* moves in space, according to the position of the icon 53*f* on the lower screen (that is, the touch position). Specifically, points on the lower screen are one-to-one correspondence with respective points on the object placement plane 54, and the object, which corresponds to the icon being dragged, is placed above the position, which corresponds to the current touch position, on the object placement plane 54. The position, on the object placement plane 54, which corresponds to the current touch position, can be calculated, for example, by transforming the coordinates, which represents the current touch position, to coordinates in the virtual space, by use of a previously-prepared coordinate transformation function. As a result, verification that the move operation on the object 52*f* is in progress can be obtained from the image displayed on the upper screen, and also from the image displayed on the lower screen. In addition, during the move operation, the other objects return to their original positions, and the image on the upper screen is zoomed out, displaying the entire room. Therefore, the move operation can be performed on the desired object, while verifying, on the upper screen, the positions of the other objects placed in the room.

Figure 16:
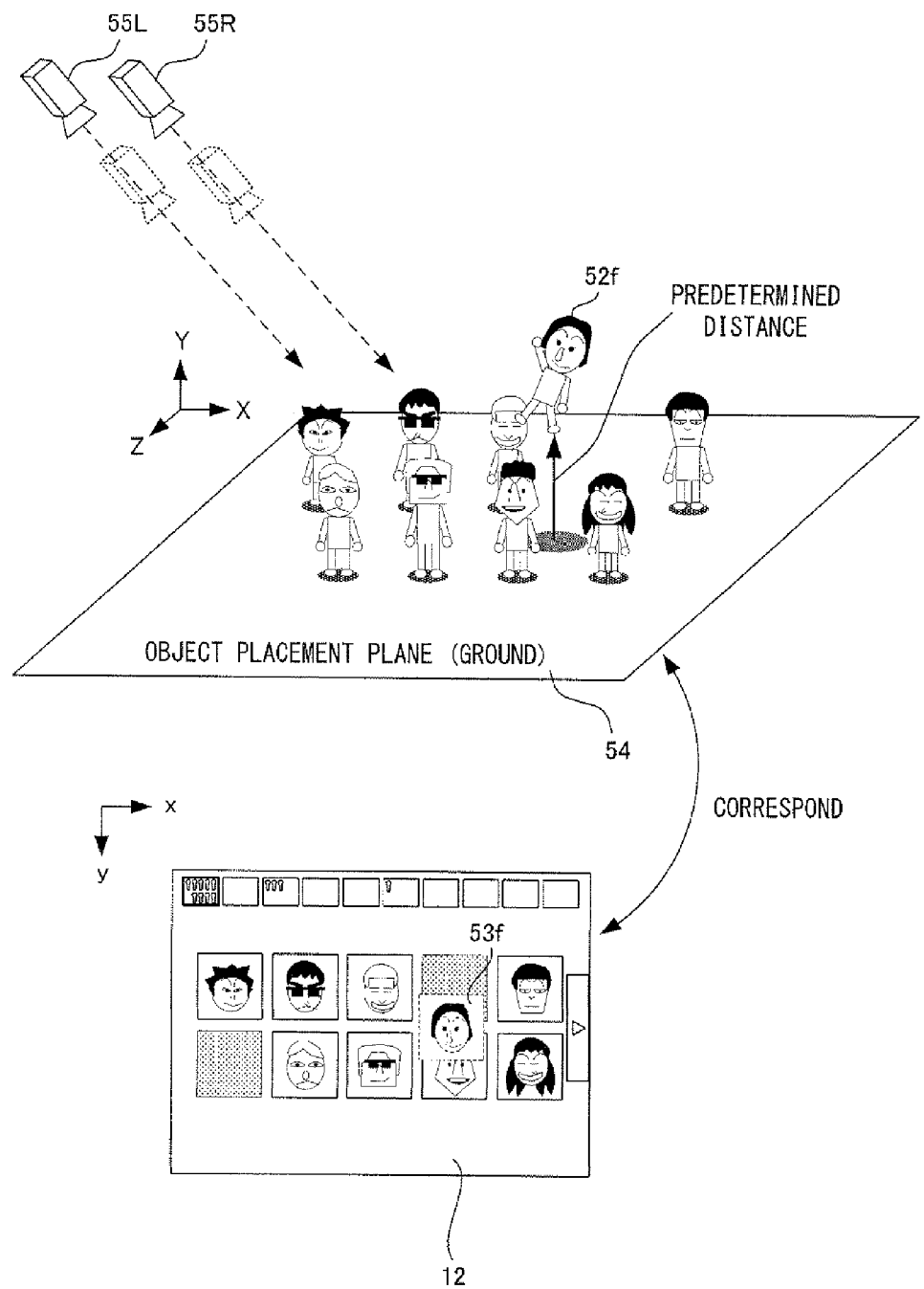
FIG. 16 is a diagram illustrating the method of generating the image to be displayed on the upper LCD 22 while the move operation is in progress.

FIG. 16 shows a state of the virtual space during the move operation. As shown in FIG. 16, the object 52*f*, which corresponds to the icon 53*f* being dragged, ascends a predetermined distance above the object placement plane 54, and moves. That is, the object, on which the move operation is in progress, moves along a plane spaced apart by the predetermined distance from the object placement plane 54.

Figure 17:
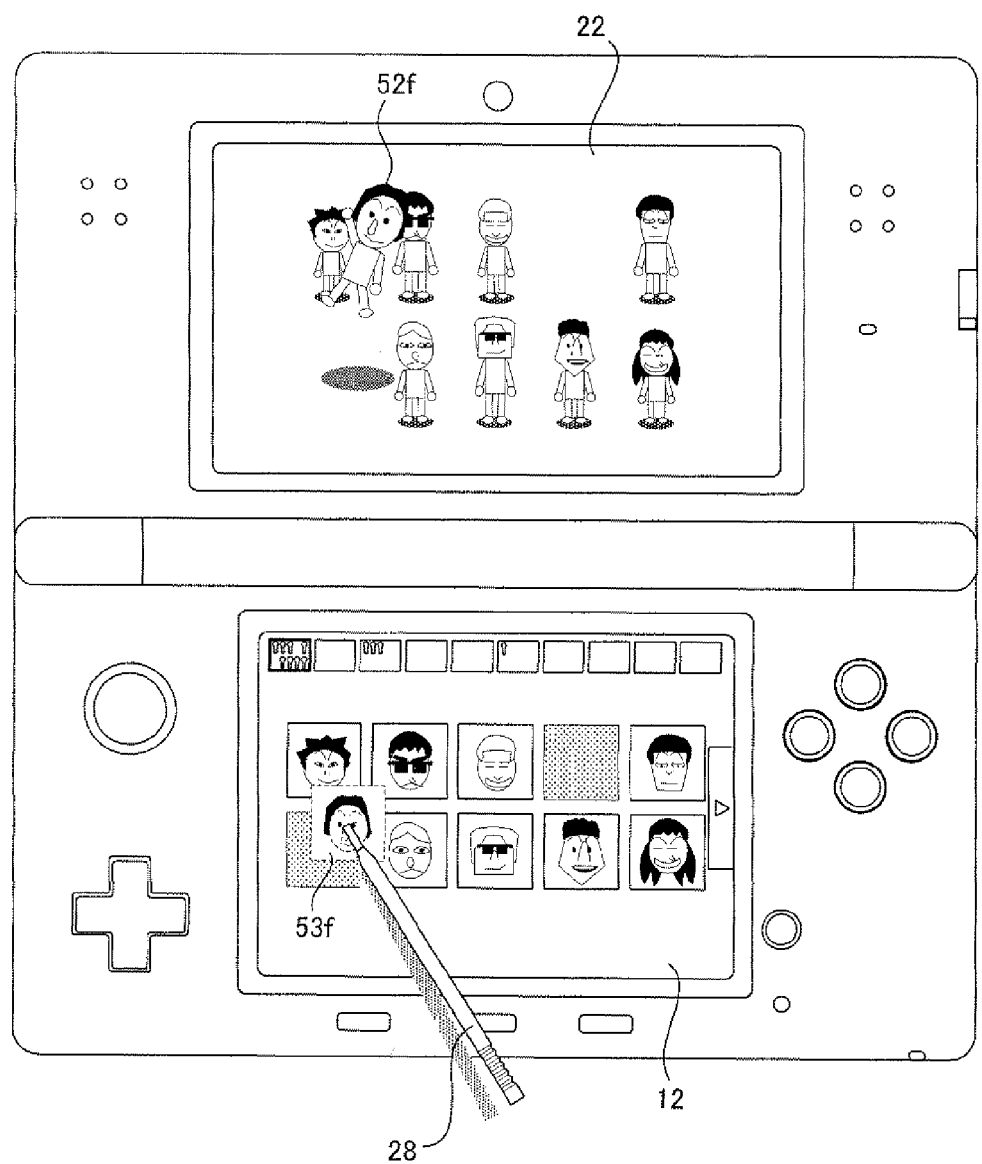
FIG. 17 is a diagram illustrating an example of images displayed immediately before the move operation ends.
Figure 18:
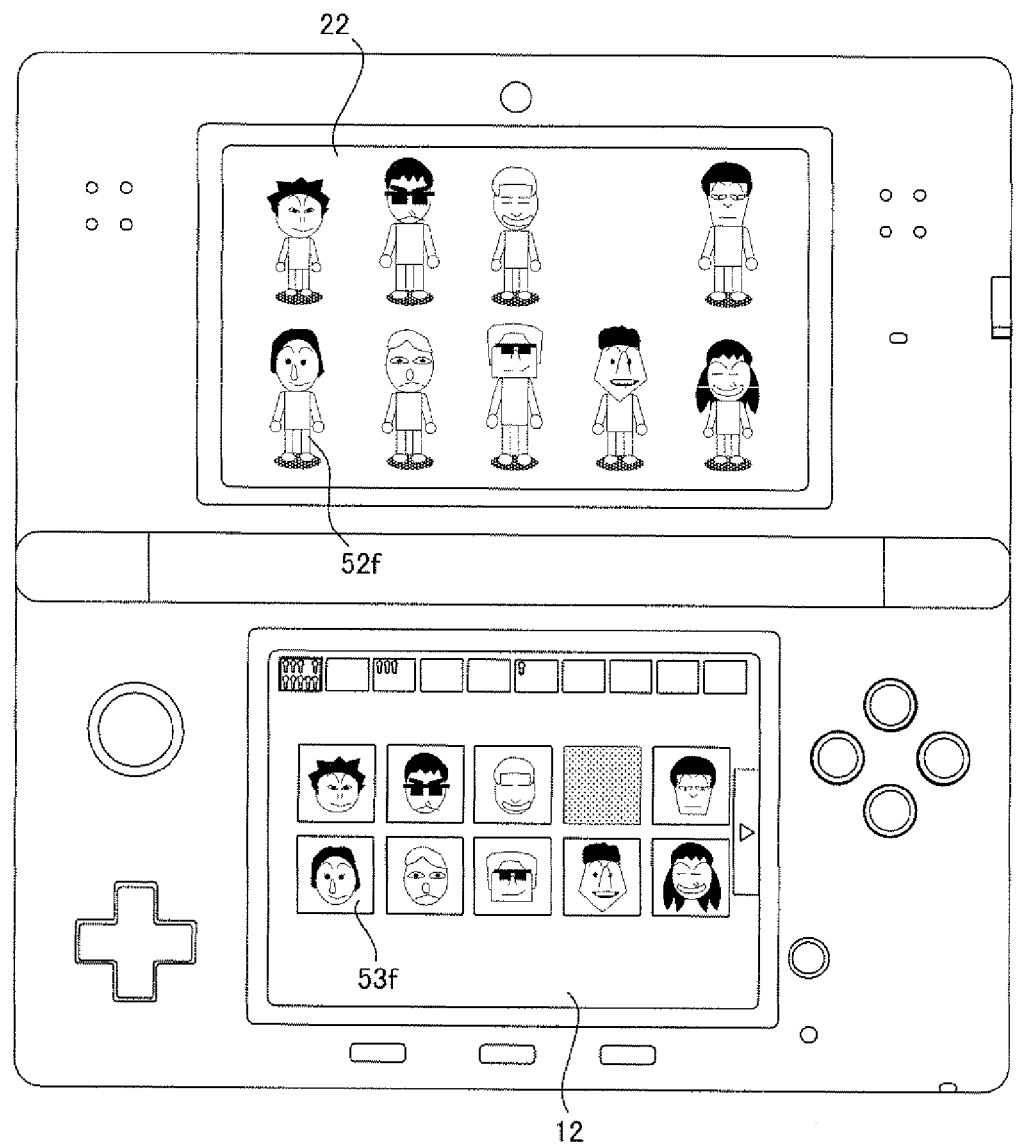
FIG. 18 is a diagram illustrating an example of images displayed immediately after the move operation ends.

FIG. 17 shows an example of images displayed on the upper screen and the lower screen immediately before the completion of the move operation on the object 52*f* in the placement area A2 (see FIG. 10), which has been dragged from the placement area A7, (that is, the icon 53*f* is dropped in the placement area A2). In the state shown in FIG. 17, if the user moves the touch pen 28 away from the touch panel 13 (that is, drops the icon 53*f*), the icon 53*f* is placed in the placement area A2 on the lower screen and the display state (translucent) of the icon 53*f* returns to the original state, as shown in FIG. 18. In addition, the object 52*f* descends on the object placement plane 54 on the upper screen, and moves to the position P2 in the virtual space, which corresponds to the placement area A2. Furthermore, the zoomed-out state of the image of the upper screen is cancelled. As a result, the object 52*f* is moved from the seventh section of the first room to the second section of the first room shown in FIG. 7.

Figure 19:
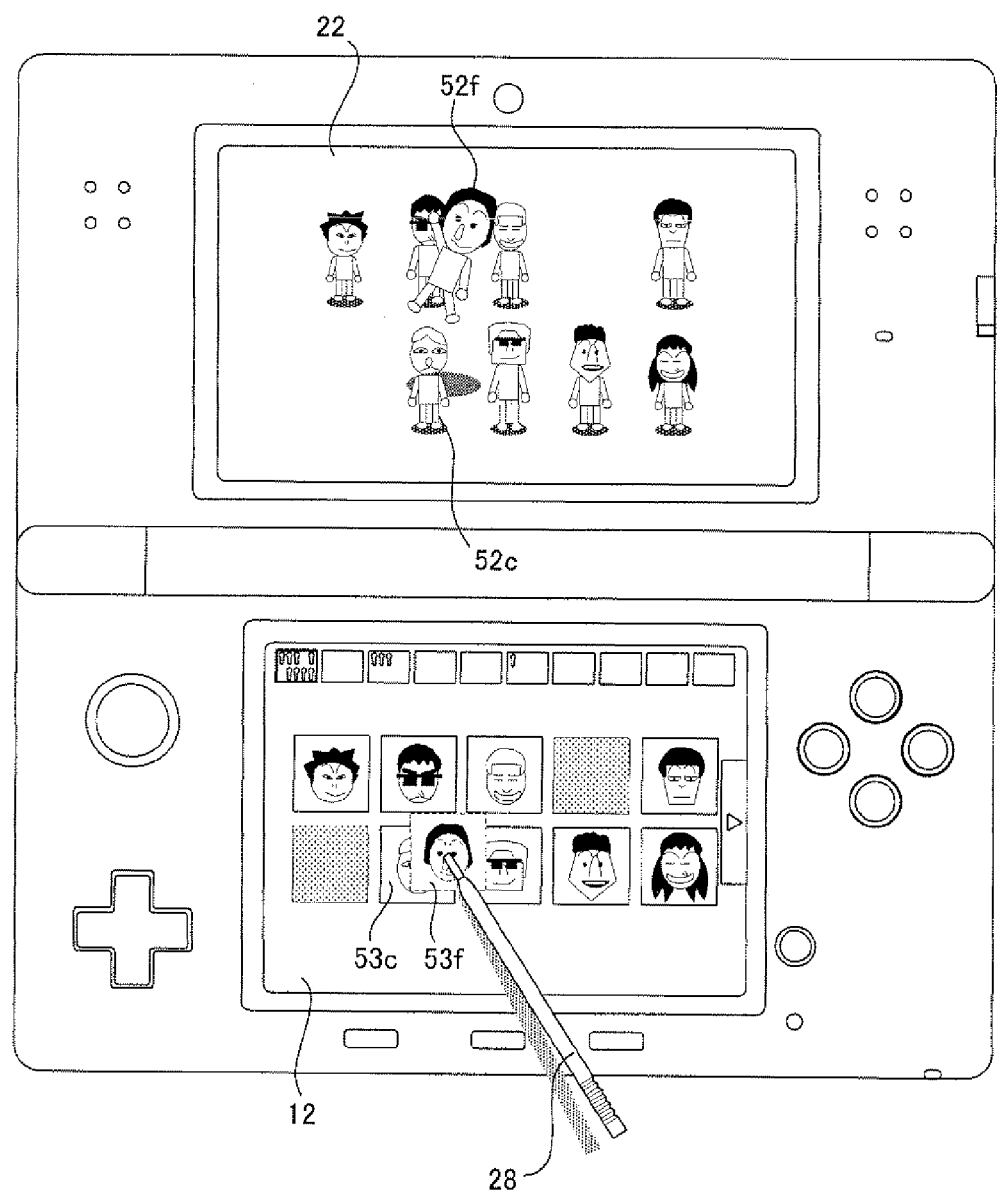
FIG. 19 is a diagram illustrating an example of images displayed immediately before the move operation (interchanging operation) ends.
Figure 20:
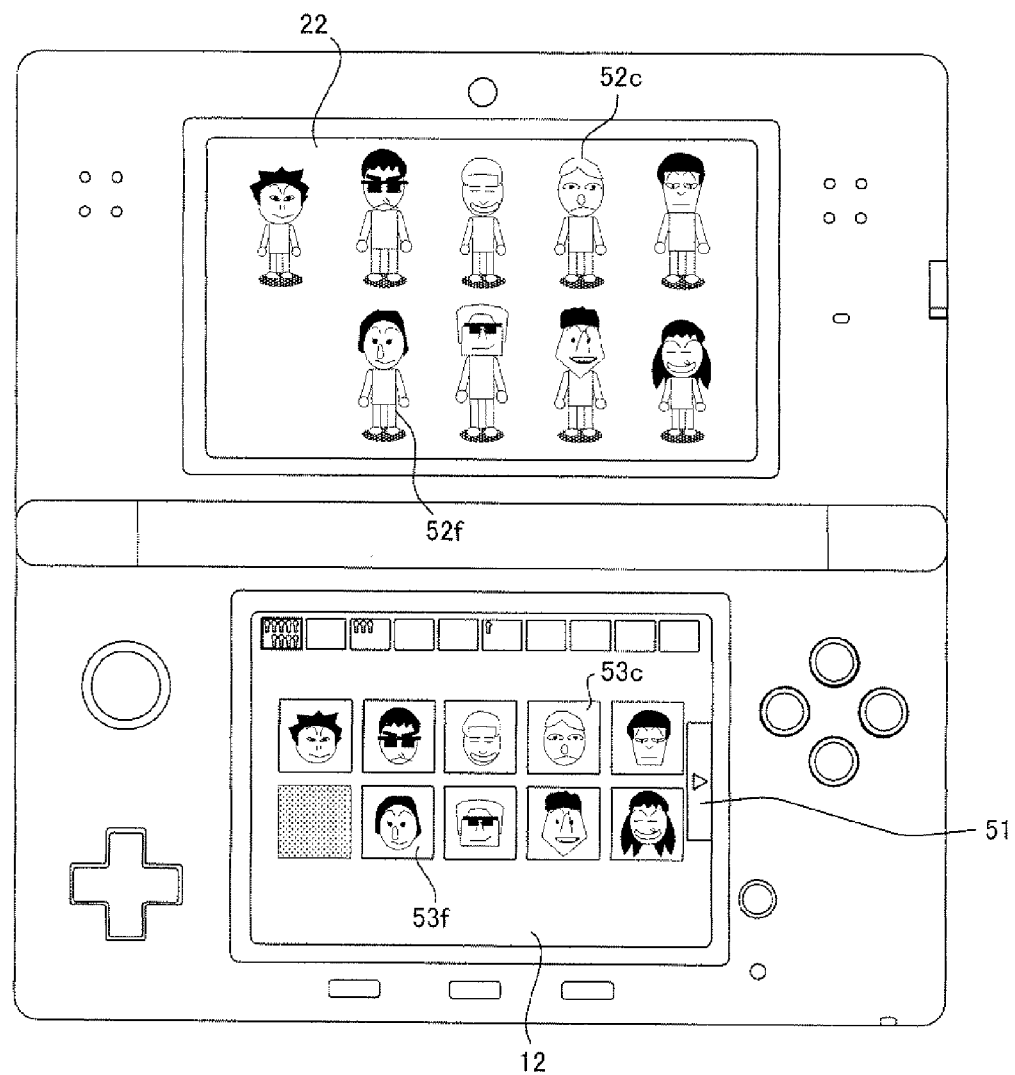
FIG. 20 is a diagram illustrating an example of images displayed immediately after the move operation (the interchanging operation) ends.

FIG. 19 shows an example of images displayed on the upper screen and the lower screen immediately before the completion of the move operation on the object 52*f* in the placement area A4 (see FIG. 10) (that is, the icon 53*f* is dropped in the placement area A4). In the state shown in FIG. 19, if the user moves the touch pen 28 away from the touch panel 13 (that is, drops the icon 53*f*), the position of the dropped icon 53*f* and the position of the icon 53*c* which has been placed in the placement area A4 are switched to each other as shown in FIG. 20, and the display state (translucent) of the icon 53*f* returns to the original state. In addition, on the upper screen, the object 52*f* descends on the object placement plane 54, and moves to the position P4 in the virtual space, which corresponds to the placement area A4, and the object 52*c* moves to the position P7 in the virtual space, which corresponds to the placement area A7 (for example, an animation is displayed that the object 52*c* runs to move to the position P7 in the virtual space). Furthermore, the zoomed-out state of the image of the upper screen is cancelled. As a result, the object 52*f* moves from the seventh section of the first room to the fourth section of the first room, and the object 52*c* moves from the fourth section of the first room to the seventh section of the first room shown in FIG. 7.

In the case where the position, at which the icon 53*f* is dropped, is not in any of the placement areas A1 through A10, the icon 53*f* returns to the original position (that is, the placement area A7) and the object 52*f* also returns to the original position (that is, the position P7 in the virtual space) accordingly, (for example, an animation is displayed that the object 52*f* instantly moves from the position P7 to be positioned at the predetermined distance above the position P7 in the virtual space and then comes down on the object placement plane 54).

(Room Change)

The user can also move the desired object to a different room. Specifically, the user moves the touch position so as to be on one of the room icons 50 or the room change icon 51, while dragging the icon, thereby changing the room.

Figure 21:
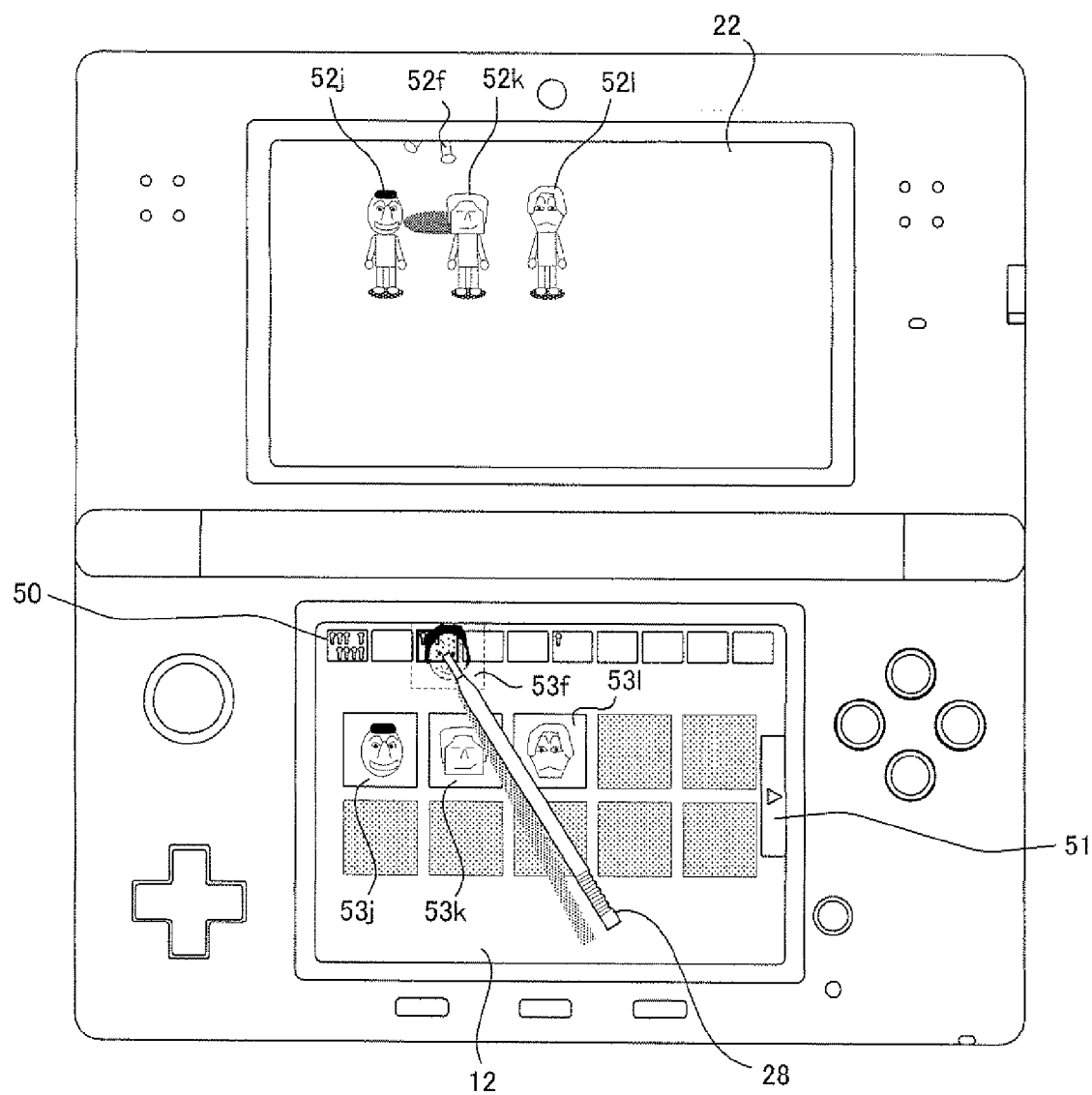
FIG. 21 is a diagram illustrating an example of images displayed immediately after the room is changed while the move operation is in progress.

FIG. 21 shows an example of images displayed on the upper screen and the lower screen immediately after the room is changed from the first room to the third room by the user moving the touch position so as to be on one of the room icons 50, while dragging the icon 53*f*. In FIG. 21, on the lower screen, icons 53*j*, 53*k*, and 53*l*, which correspond to the objects 52*j*, 52*k*, and 52*l* placed in the third room, respectively, are displayed, and on the upper screen, the objects 52*j*, 52*k*, and 52*l* placed in the third room are displayed. At the state shown in FIG. 21, the user drops the icon 53*f* in a desired placement area from among the placement areas A1 through A10 in the third room, thereby moving the object 52*f* to a desired section in the third room. For example, in the case where the icon 53*f* is dropped in a placement area in which no icon is placed (the placement areas A2, A4, and A6 through A10 in the example shown in FIG. 21), the same process as one described with the reference to FIG. 17 and FIG. 18 is performed. In the case where the icon 53*f* is dropped in a placement area in which the icon has already been placed (the placement areas A1, A3, and A5 in the example shown in FIG. 21), the same process as one described with reference to FIG. 19 and FIG. 20 is performed.

(Detailed Operation Performed by Game Apparatus 10)

Hereinafter, the operation performed by the game apparatus 10 will be described in detail, with reference to FIGS. 22, 23, 24, 25, 26, and 27.

(Memory Map)

Figure 22:
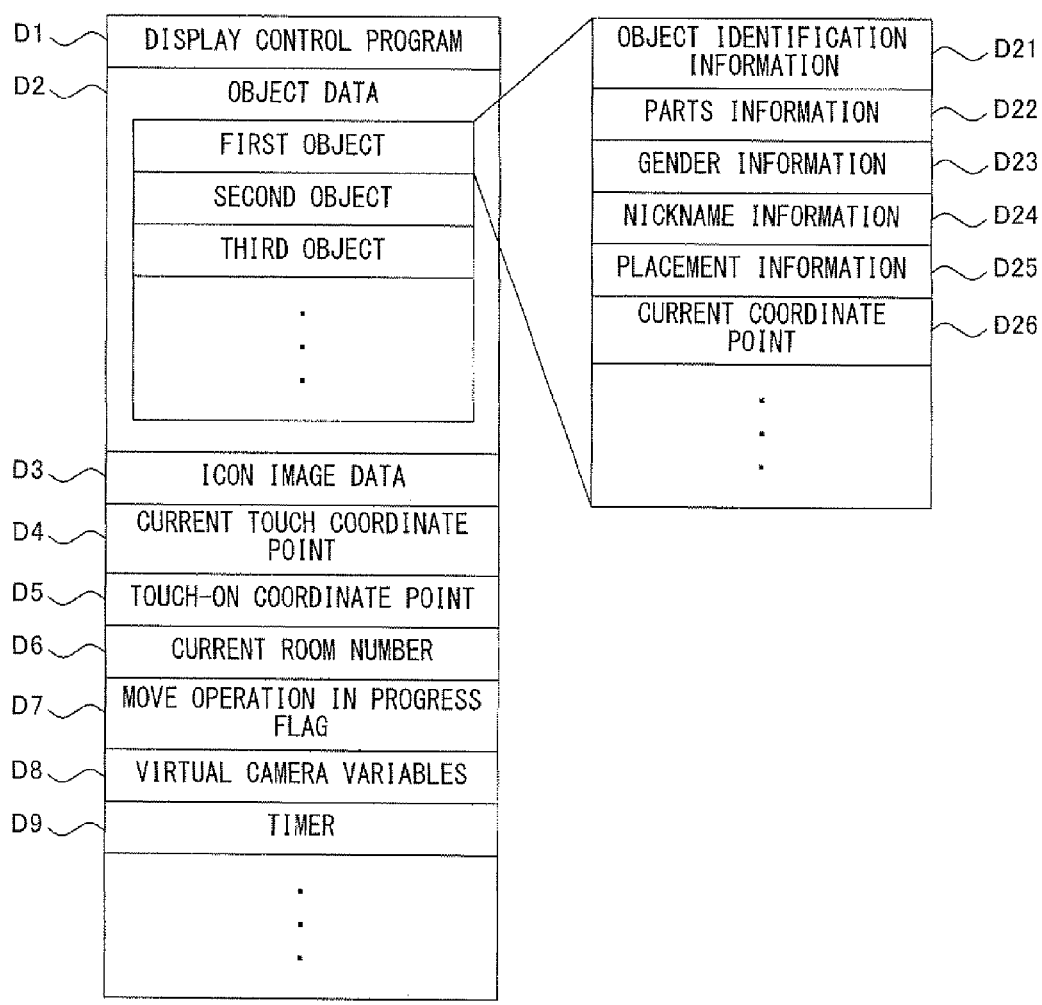
FIG. 22 is a diagram illustrating an example of a memory map of a main memory 32.

FIG. 22 shows an example of data which is stored in the main memory 32 at the execution of the display control process. The display control program D1 is a computer program which causes the CPU 311 to execute the display control process as described above. The display control program D1 may be loaded from a computer-readable storage medium, such as the external memory 44, into the main memory 32, or may be loaded from another information processing apparatus (the server device or another game apparatus) into the main memory 32 through the wireless communication module 36 or the local communication module 37.

The object data D2 is information relating to one or more objects representing a human, which are created by the user or acquired from the another game apparatus or the server device through communication. Part of the object data D2 (such as object identification information D21, parts information D22, gender information D23, nickname information D24, placement information D25, a current coordinate point D26 described below) is stored in the internal data storage memory 35, and read from the internal data storage memory 35 to be loaded into the main memory 32, according to need.

The object data D2 includes information for each object, such as the object identification information D21, the parts information D22, the gender information D23, the nickname information D24, the placement information D25, and the current coordinate point D26. The object identification information D21 is information for identifying the plurality of objects to each other. The parts information D22 is information which defines the shapes, positions and sizes of parts (such as contour, body shape, eyes, nose, lips, eyebrows, and hair style) of each object. Each of the gender information D23 and the nickname information D24 is information indicating a gender and a nickname of the object, respectively. The placement information D25 is information indicating which section in which room shown in FIG. 7 the object is placed. The current coordinate point D26 a coordinate point indicating a current position of the object in the virtual space.

The icon image data D3 is image data for the icon displayed on the lower screen. In the present embodiment, the head of the object (the three dimensional polygon model) generated based on the object data is rendered based on the virtual cameras arranged in front of the object and thereby, an icon image data corresponding to the object is generated and stored in the main memory 32.

The current touch coordinate point D4 is a coordinate point indicating latest touch position with respect to the touch panel 13.

The touch-on coordinate point D5 is coordinate point indicating the touch position immediately after the state, in which the touch panel 13 is not touched, has changed to a state where the touch panel 13 is touched.

The current room number D6 is information indicating a room number to be displayed on the upper screen and the lower screen.

A move operation in progress flag D7 is a flag indicating whether or not the move operation is in progress.

Virtual camera variables D8 are variables relating to the respective positions, orientations, and the like, of the right virtual camera 55R and the left virtual camera 55L.

A timer D9 is information indicating time elapsed from a predetermined time point.

Next, flows of the process steps performed by the CPU 311 based on the display control program D1 will be described with reference to flowcharts shown in FIGS. 23, 24, 25, 26, and 27.

Figure 23:
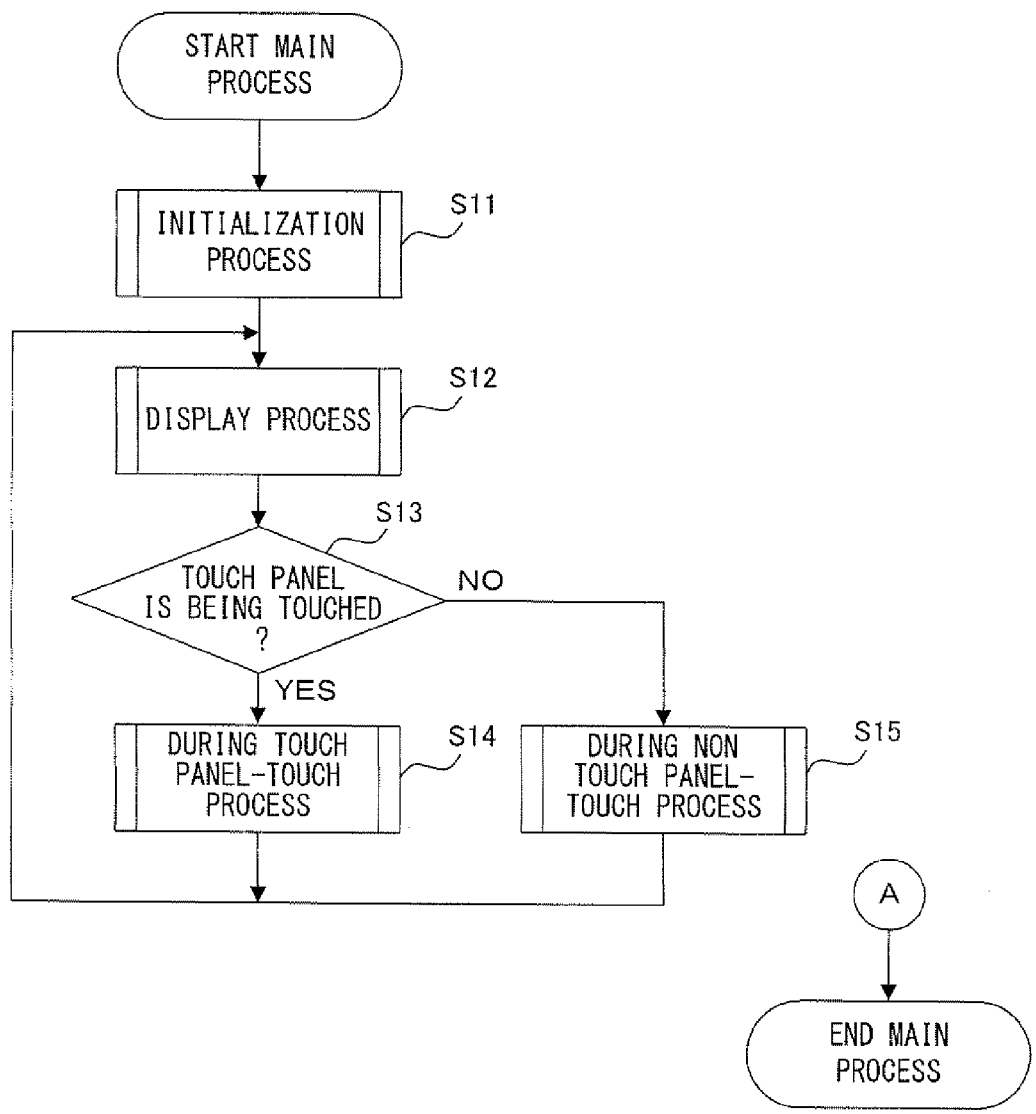
FIG. 23 is a flow chart showing a main process flow.

FIG. 23 is a flowchart showing a flow of a main process steps performed by the CPU 311, based on the display control program D1.

In step S11 shown in FIG. 23, the CPU 311 performs an initialization process. Hereinafter, detail of the initialization process performed in step S11 will be described with reference to the flowchart shown in FIG. 24.

Figure 24:
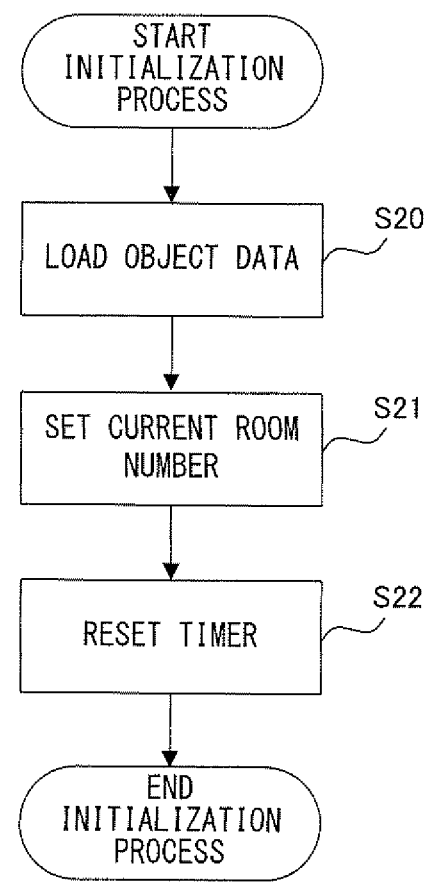
FIG. 24 is a flow chart showing in detail an initialization process.

In step S20 shown in FIG. 24, the CPU 311 loads the object data (the object identification information D21, the parts information D22, the gender information D23, the nickname information D24, the placement information D25), which is stored in the internal data storage memory 35, to store the object data in the main memory 32.

In step S21, the CPU 311 sets the current room number. The number set here may be, for example, a previously determined initial value (1, for example), or a room number of a room, in which a certain object (an object representing the user of the game apparatus 10, for example) is placed, may be set as the current room number.

In step S22, the CPU 311 resets the timer D9 to the initial value (0, for example). The initialization process then ends and the process proceeds to step S12 shown in FIG. 23.

Returning to FIG. 23, the CPU 311 performs the display process in step S12. The display process is performed to generate images to be displayed on the upper screen and the lower screen, respectively, thereby displaying the generated images on the upper LCD 22 and the lower LCD 12, respectively. Hereinafter, detail of the display process performed in step S12 will be described with reference to the flowchart shown in FIG. 25.

Figure 25:
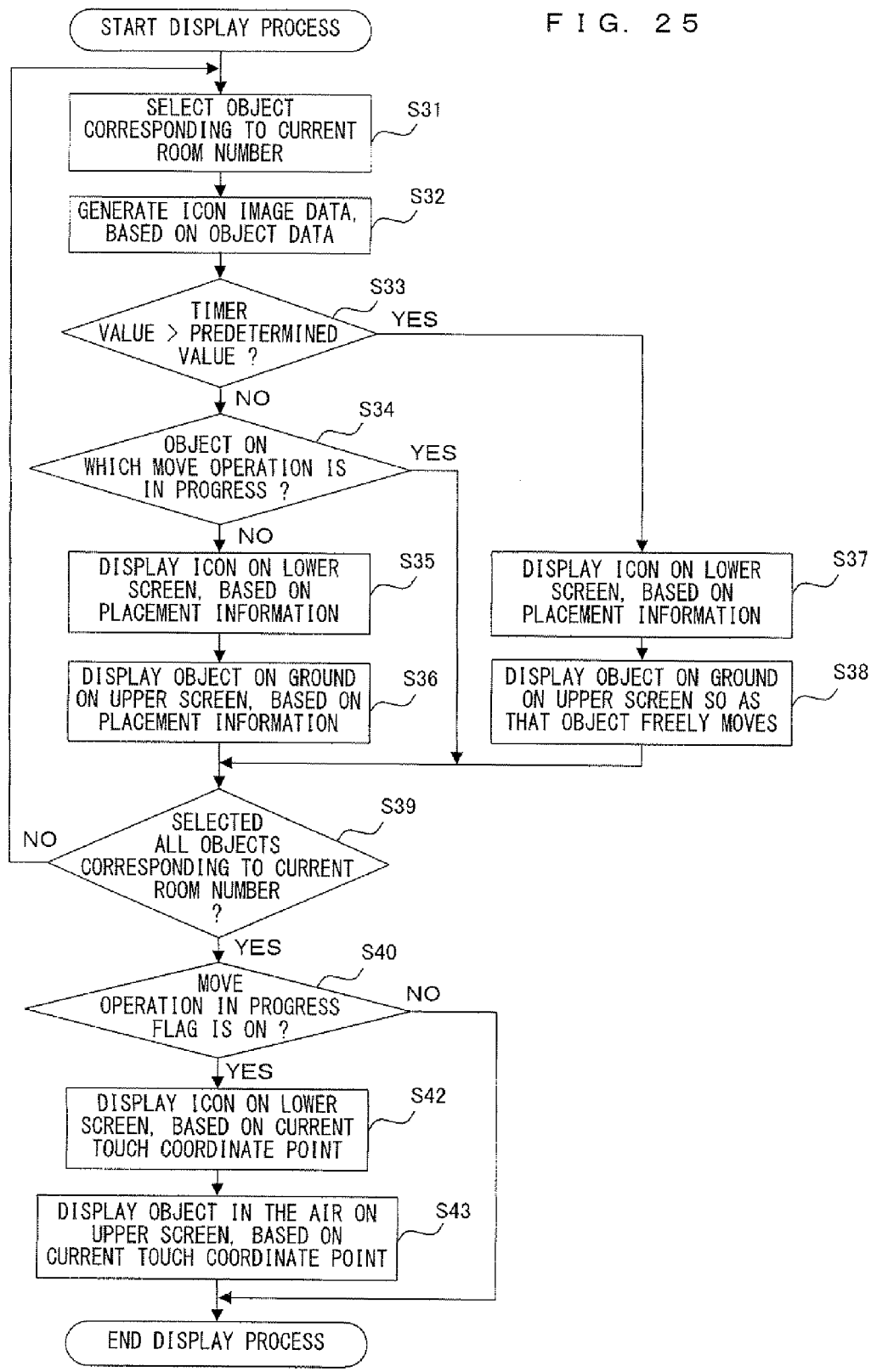
FIG. 25 is a flow chart showing in detail a display process.

In step S31 shown in FIG. 25, the CPU 311 selects one object corresponding to the current room number D6 (that is, an object placed in the room indicated by the current room number D6).

In step S32, the CPU 311 generates the icon image data D3, based on the object data of the object selected in step S31, and stores the generated data in the main memory 32. Specifically, on the basis of the virtual cameras arranged in front of the object, the CPU 311 renders the head of the object (the three dimensional polygon model) generated based on the object data, thereby generating the icon image data corresponding to the object.

In step S33, the CPU 311 determines whether a value of the timer D9 has exceeded the predetermined value. In the case where the predetermined value is not exceeded, the process proceeds to step S34. In the case where the predetermined value is exceeded, the process proceeds to step S37.

In step S34, the CPU 311 determines whether the object data selected in step S31 is the object data regarding to the object on which the move operation is in progress (that is, the object which corresponds to the icon being dragged). In the case of the object data regarding to the object on which the move operation is in progress, the process proceeds to step S39. Otherwise, the process proceeds to step S35.

In step S35, on the basis of the placement information D25 included in the object data selected in step S31, the CPU 311 displays the icon, which corresponds to the object data, in the placement area (any of the placement areas A1 through A10), which corresponds to the placement information D25, on the lower screen.

In step S36, on the basis of the placement information D25 included in the object data selected in step S31, the CPU 311 updates the current coordinate point D26 corresponding to the object, and displays the object so that the object corresponding to the object data is displayed on the upper screen at the position (any of the positions P1 through P10 on the object placement plane 54) in the virtual space, which corresponds to the placement information D25.

In step S37, on the basis of the placement information D25 included in the object data selected in step S31, the CPU 311 displays the icon, which corresponds to the object data, on the lower screen at the placement area (any of the placement areas A1 through A10) corresponding to the placement information D25.

In step S38, the CPU 311 updates the current coordinate point D26 of the object in accordance with a predetermined algorithm (in a random manner, for example) and displays the object so that the object indicated by the object data selected in step S31 freely moves in the virtual space on the upper screen.

In step S39, the CPU 311 determines whether the selection of all objects corresponding to the current room number D6 has been performed. In the case where the selection of the all objects corresponding to the current room number D6 has been performed, the process proceeds to step S40. Otherwise, the process returns to step S31.

In step S40, the CPU 311 determines whether the move operation in progress flag D7 is ON (that is, whether any icons is being dragged). In the case where the move operation in progress flag D7 is ON, the process proceeds to step S42. Otherwise, the CPU 311 ends the display process, and the process proceeds to step S13 shown in FIG. 23.

In step S42, on the basis of the current touch coordinate point D4, the CPU 311 displays the icon, which corresponds to the object on which the move operation is in progress, on the lower screen at the position indicated by the current touch coordinate point D4.

In step S43, on the basis of the current touch coordinate point D4, the CPU 311 displays the object, on which the move operation is in progress, on the upper screen above (in the air) the position in the virtual space, which corresponds to the current touch coordinate point D4, (the position on the object placement plane 54). The CPU 311 then ends the display process, and the process proceeds to step S13 shown in FIG. 23.

Returning to FIG. 23, in step S13, on the basis of the signal outputted from the touch panel 13, the CPU 311 determines whether the user is touching the touch panel 13. In the case where the user is touching the touch panel 13, the process proceeds to step S14. Otherwise, the process proceeds to step S15.

In step S14, the CPU 311 performs during a touch panel-touch process. Hereinafter, detail of during the touch panel-touch process performed in the step S14 will be described with reference to the flowchart shown in FIG. 26.

Figure 26:
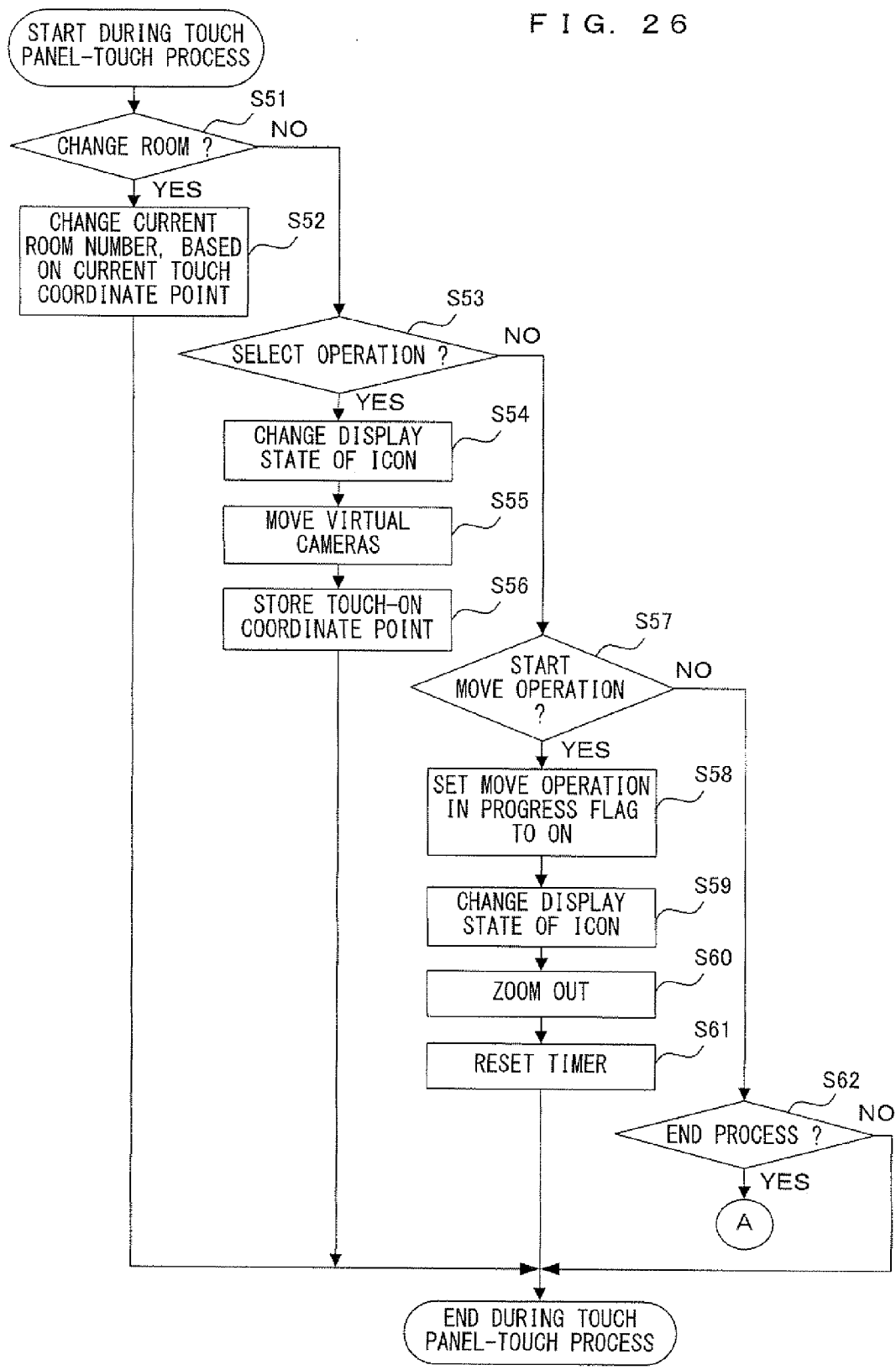
FIG. 26 is a flowchart showing in detail during a touch panel-touch process.

In step S51 shown in FIG. 26, on the basis of the current touch coordinate point D4, the CPU 311 determines whether room change is indicated (that is, whether one of the room icons 50 or the room change icon 51 is touched). In the case where the room change is indicated, the process proceeds to step S52. Otherwise, the process proceeds to step S53.

In step S52, on the basis of the current touch coordinate point D4, the CPU 311 changes the current room number D6. The CPU 311 then ends during the touch panel-touch process, and the process returns to step S12 shown in FIG. 23.

In step S53, the CPU 311 determines whether the selection operation is performed. Specifically, on the basis of the signal outputted from the touch panel 13, the CPU 311 determines that the selection operation is performed upon detection that any of the icons displayed on the lower screen is touched. In the case where the selection operation is performed, the process proceeds to step S54. Otherwise, the process proceeds to step S57.

In step S54, the CPU 311 changes the display state of the touched icon. Specifically, the CPU 311 changes the background color of the touched icon to red.

In step S55, the CPU 311 moves the pair of virtual cameras (the right virtual camera 55R and the left virtual camera 55L) (that is, updates the virtual camera variables D8) so that the object corresponding to the touched icon is displayed near the center of the upper screen.

In step S56, the CPU 311 stores in the main memory 32 the same coordinate point as the current touch coordinate point D4, as the touch-on coordinate point D5. The CPU 311 then ends during the touch panel-touch process, and the process returns to step S12 shown in FIG. 23.

In step S57, the CPU 311 determines whether the move operation is started. Specifically, on the basis of the signal outputted from the touch panel 13, the CPU 311 determines that the move operation is started upon the detection that any of the icons displayed on the lower screen is dragged. Whether any of the icons is dragged can be determined by, for example, whether the current touch coordinate point D4 is moved away from the touch-on coordinate point D5 by the predetermined distance or farther. In the case where the move operation is started, the process proceeds to step S58. Otherwise, the process proceeds to step S62.

In step S58, the CPU 311 sets the move operation in progress flag D7 to ON.

In step S59, the CPU 311 changes the display state of the icon corresponding to the object for the move operation (that is, the icon started to be dragged). Specifically, the CPU 311 changes the icon started to be dragged to translucent.

In step S60, the CPU 311 zooms out the image on the upper screen. Specifically, the CPU 311 moves the pair of virtual cameras (the right virtual camera 55R and the left virtual camera 55L) rearward (that is, updates the virtual camera variables D8).

In step S61, the CPU 311 resets the timer D9. The CPU 311 then ends during the touch panel-touch process, and the process returns to step S12 shown in FIG. 23.

In step S62, the CPU 311 determines whether END button (not shown) displayed on the lower screen is touched. In the case where END button is touched, the process returns to the process shown in FIG. 23 to end the main process. Otherwise, the CPU 311 ends during the touch panel-touch process, and the process returns to step S12 shown in FIG. 23.

Returning to FIG. 23, in step S15, the CPU 311 performs during a non touch panel-touch process. Hereinafter, detail of during the non touch panel-touch process performed in step S15 will be described with reference to the flowchart shown in FIG. 27.

Figure 27:
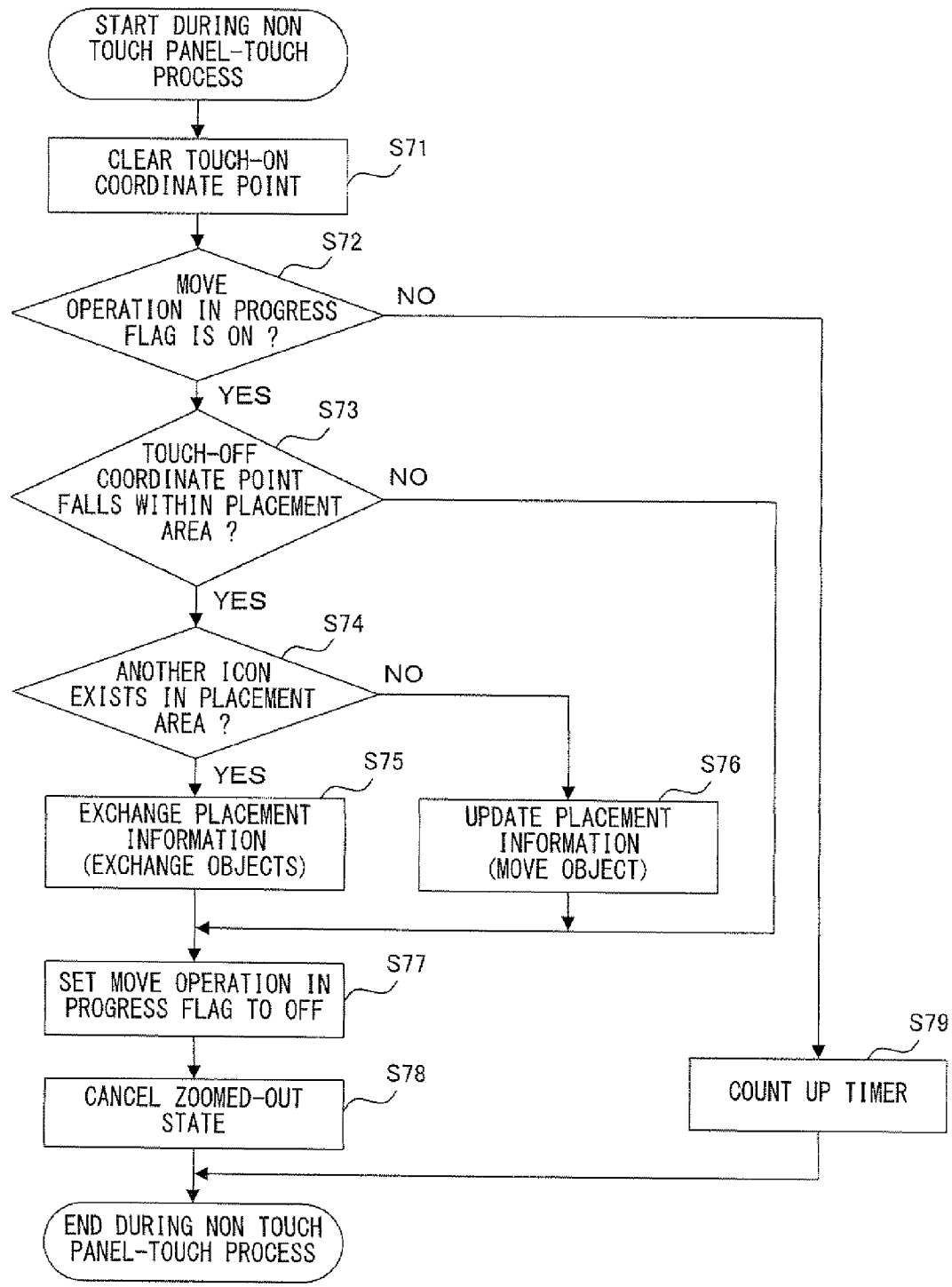
FIG. 27 is a flowchart showing in detail during a non touch panel-touch process.

In step S71 shown in FIG. 27, the CPU 311 clears the touch-on coordinate point D5.

In step S72, the CPU 311 determines whether the move operation in progress flag D7 is ON. In the case where the move operation in progress flag D7 is ON, the process proceeds to step S73. Otherwise, the process proceeds to step S79.

In step S73, the CPU 311 determines whether the touch-off coordinate point (a coordinate point indicating the position at which the icon is dropped) falls within any of the placement areas A1 through A10. In the case where the touch-off coordinate point falls within any of the placement areas, the process proceeds to step S74. Otherwise, the process proceeds to step S77.

In step S74, the CPU 311 determines whether another icon exists in the placement area in which the icon is dropped. In the case where another icon exists, the process proceeds to step S75. Otherwise, the process proceeds to step S78.

In step S75, the CPU 311 interchanges the placement information D25 of the object corresponding to the dropped icon with the placement information D25 of the object corresponding to the another icon which exists in the placement area in which the icon is dropped.

In step S76, the CPU 311 updates the placement information D25 of the object corresponding to the dropped icon in accordance with the placement area in which the icon is dropped.

In step S77, the CPU 311 sets the move operation in progress flag D7 to OFF.

In step S78, the CPU 311 restores the image of the upper screen, which has been zoomed out in step S60 shown in FIG. 26, to the original state. Specifically, the CPU 311 returns the pair of virtual cameras (that is, the right virtual camera 55R and the left virtual camera 55L) to the original positions (that is, updates the virtual camera variables D8). The CPU 311 then ends during the non touch panel-touch process, and the process returns to step S12 shown in FIG. 23.

In step S79, the CPU 311 counts up (increments) the timer D9. The CPU 311 then ends during the non touch panel-touch process, and the process returns to step S12 shown in FIG. 23.

(Effects of Embodiment)

As described above, in the preset embodiment, because the object is displayed on the upper screen, and the icon corresponding to the object is displayed on the lower screen, the information that the user can obtain from the upper screen is different from the information that can be obtained from the lower screen. For example, the user can easily understand a three dimensional shape of each object from the upper screen, and the user can accurately understand the section in which each object is placed from the lower screen. Particularly, it is difficult to clearly understand each object is placed in which section in an image, like the image displayed on the upper screen in the present embodiment, which obliquely looks down on the object. However, in the image displayed on the lower screen, a state in which the entire room is directly looked down is schematically displayed, thereby allowing the accurate understanding of the section in which each object is placed. In addition, by watching the upper screen, the user can better realistically understand that each object is placed in which section, and the positional relationship between the objects.

Further, in the present embodiment, the user can verify the position of the object by means of both upper screen and lower screen. Therefore, for example, although, at an instant when touching the desired icon, the user needs to watch the lower screen, once the user has touched the desired icon, the user can perform the move operation, while watching the upper screen and thus, as compared to the case where the user performs the move operation, while watching merely the lower screen, the user can be more interested in performing the move operation.

In addition, in the present embodiment, the user does not directly move the object displayed on the upper screen, but moves the icon displayed on the lower screen, thereby indirectly moving the object in the virtual space. Therefore, the change of the position of the object in the virtual space can be easily and accurately made. Furthermore, at the move operation, there is no such a case where a finger of the user or the touch pen 28 cuts across the upper screen, or a cursor, a pointer, or the like is displayed on the upper screen and therefore, the visibility of the upper screen and the reality of the object displayed on the upper screen are retained. In addition, there is no need for displaying the cursor, the pointer, or the like on the upper screen, thereby obviating the need for a process to synthesize the stereoscopic image with the cursor or the pointer. As a result, the processing burden of the computer is mitigated.

Further, in the present embodiment, because, when the user moves the icon displayed on the lower screen, the object on the upper screen moves in real time, interlocking with the movement of the icon, the user obtains the realistic feeling of operation of actually moving the object in the virtual space. Moreover, the object can be made more natural and attractive.

Further, in the present embodiment, because, while the move operation is not being performed, the object is controlled so as to move freely, the object is represented, not artificial, but more attractive, interesting the user. Furthermore, because, at the time point when the move operation is started, each object returns to the original position thereof, the user can better realistically understand that each object is placed in which section, and the positional relationship between the objects by watching the upper screen during the move operation.

Further, in the present embodiment, although, while the move operation is not being performed, the image on the upper screen is zoomed in or the display range on the upper screen changes in accordance with the instruction from the user, the image on the upper screen is zoomed out (that is, the display scale of the upper screen becomes small) at the time point when the move operation is started so that the positions P1 through P10 in the virtual space fall within the upper screen. Therefore, by watching the upper screen during the move operation, the user can understand the view of the entire room.

Further, in the present embodiment, because the plurality of placement areas A1 through A10 are displayed on the lower screen in such a form that the user can understand the borders between the placement areas, even in the case where the plurality of sections are not clearly displayed on the upper screen, the user can accurately move the desired object to the desired section by watching the lower screen. As a result, it is not necessarily to display on the upper screen areas or the positions P1 through P10 in the virtual space, which correspond to the placement areas A1 through A10, and thus the positions P1 through P10 or symbols or lines representing the region need not to be displayed on the upper screen, thereby retaining the visibility of the upper screen and the reality of the virtual space displayed on the upper screen.

Further, in the present embodiment, because the object for the move operation moves being away from the object placement plane on which the other objects are placed, the object for the move operation and the other objects do not cross one another in the middle of the move operation. Therefore, the visibility of the upper screen is not lowered because of the objects crossing one another, and there is no need for a process, which avoids a possible collision to prevent the object crossing one another to be incorporated.

(Modification)

While the example is given that the display control process is executed in the hand-held game apparatus in the embodiment described above, the present invention is not limited thereto, and is applicable to any information processing apparatus or information processing system (for example, desktop computers, laptop computers, mobile telephones, mobile apparatuses).

Further, while the example is given that the single CPU 311 executes the display control process in the embodiment described above, in another embodiment, a plurality of processors provided in the same information processing apparatus may corporate together to execute the display control process, or processors each provided in a plurality of information processing apparatuses in communication with each other may corporate together to execute the display control process. For example, the process which generates the image to be displayed on the upper screen, and the process which generates the image to be displayed on the lower screen may be executed by different processors.

Further, while the example is given that the upper screen and the lower screen are physically separate from each other in the embodiment described above, in another embodiment, for example, the images displayed on the upper screen and the lower screen may be displayed on a single screen in different areas. Also, the display device is not necessarily integrated with the information processing apparatus, and the display device and the information processing apparatus may be connected with each other via a cable and the connector.

Further, while the example is given that the move operation is performed by using the touch panel 13 in the embodiment described above, the present invention is not limited thereto, and any input device (preferably, a pointing device), such as the cross button 14A, the analog stick 15, a mouse, and a touch pad, can be employed. For example, if a mouse is employed instead of the touch panel 13, the move operation may be performed by dragging the icon by means of the mouse.

Further, while the example is given that the object representing a human is displayed in the embodiment described above, the present invention is not limited thereto, and any object may be displayed.

Figure 28:
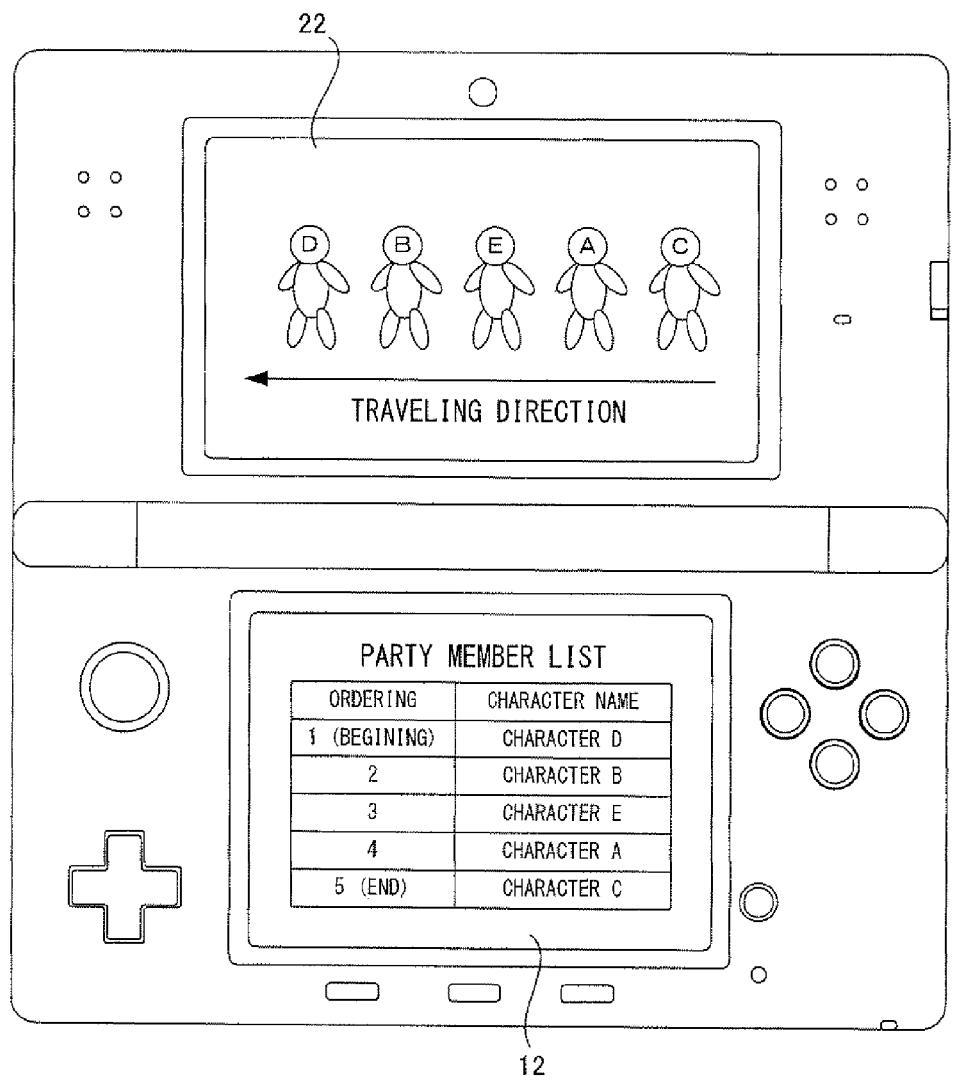
FIG. 28 is a diagram illustrating an example of a display image according to a modification.
Figure 29:
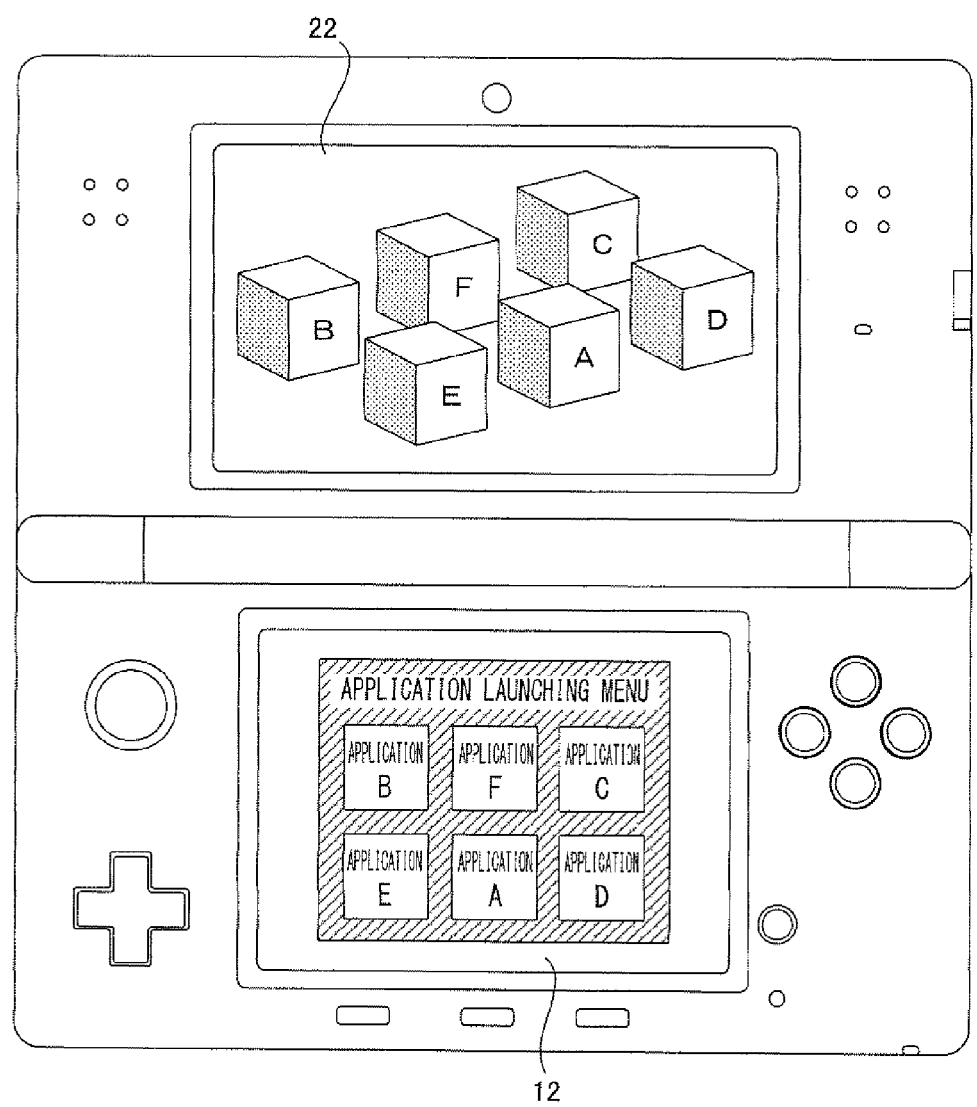
FIG. 29 is a diagram illustrating an example of a display image according to another modification.

Further, in the embodiment, while the example is given that each of the plurality of objects stored in the internal data storage memory 35 is assigned in any of the ten sections of each of the ten virtual rooms according to the object order (for example, the order of the objects stored in the internal data storage memory 35, the identification number of the object, or the like) and the corresponding icons are placed in the placement areas (A1 through A10) which correspond to the sections and displayed on the lower screen, the present invention is not limited thereto. For example, in another embodiment, in accordance with the order of the plurality of objects stored in the internal data storage memory 35, the corresponding icons may be displayed on the lower screen in a format, such as a list format or a menu format. In such a case, on the upper screen, the plurality of objects stored in the internal data storage memory 35 may be placed in the virtual space and displayed, in the order of the corresponding icons. FIG. 28 shows an example where, in a game where five characters that make up one party move in the virtual space in a line one after another, a party member list indicating the character order is displayed on the lower screen, and states of the characters, which are placed in the virtual space in accordance with the character order, are displayed on the upper screen. FIG. 29 shows an example where, when a user is caused to select a desired application from among a plurality of applications, an application launching menu showing a list of selectable applications is displayed on the lower screen, and states of objects (objects corresponding to the applications, respectively), which are placed in the virtual space in accordance with the application order on the application launching menu, are displayed on the upper screen. The placement information D25 in the above-described embodiment can refer to as information indicating the object order, or the icon order.

Further, while the example is given that the icon, which corresponds to the object displayed on the upper screen, is displayed on the lower screen in the embodiment described above, the present invention is not limited thereto, and any image (a symbol image), by which the user can understand the correspondence with the object displayed on the upper screen, may be displayed instead of the icon. Examples of such symbol image are a symbol for identifying the object, a string indicating the object name or nickname, the silhouette of the object, and the like.

Further, while the example is given that the icon image data is generated based on the object data in the embodiment described above, in another embodiment, the icon image data acquired from an external memory or the another game apparatus may be used to display the icon on the lower screen. Alternatively, the generated icon image data may be stored in the internal data storage memory 35, or the like, and appropriated for the next display control process.

Further, while the example is given that the ten placement areas each formed in a square shape are displayed on the lower screen in the embodiment described above, the present invention is not limited thereto, and any number of the placement areas formed in any shape may be displayed.

Further, while the example is given that the object is placed on the ground in the virtual space in the embodiment described above, the present invention is not limited thereto, and the object may be placed on any plane or curved surface in the virtual space. For example, the object (an object representing an insect, for example) may be placed along a wall provided in the virtual space.

Further, while the upper LCD 22 is configured to be the stereoscopic display device in the parallax barrier type in the embodiment described above, in another embodiment, the upper LCD 22 may be configured to be a stereoscopic display device in any type, such as the lenticular lens type. For example, in the case where a stereoscopic display device in the lenticular lens type is employed, the image for the left eye and the image for the right eye may be combined with each other by the CPU 311 or another processor, and then the combined image is supplied to the stereoscopic display device in the lenticular lens type.

Further, while the example is given that the object is displayed on the upper screen as a stereoscopic image in the embodiment described above, the present invention is not limited thereto, and the object may be displayed on the upper screen as a planar image.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein a display control program for use with a processing system, the display control program for displaying, on a display screen, a plurality of characters in a first display area of the display screen and a plurality of symbol images in a second display area of the display screen, which each corresponding to a respective one of the plurality of characters, the display control program causing a computer to function as:

a symbol image display control unit configured to, by using the processing system, concurrently display the plurality of symbol images in the second display area of the display screen such that no other symbol images are concurrently visible on the display screen, where the plurality of symbol images are displayed at positions on the display screen according to an order thereof;

an object display control unit that is, by using the processing system, configured to:
place every one of the plurality of characters at positions in the first display area of the display screen, which are based on the order used to display the plurality of symbol images in the second display area of the display screen, in a virtual space so that the positional relationship of every one of the concurrently displayed plurality of symbol images corresponds the respective one of the plurality of characters that has been placed in the virtual space, and
with the concurrent display of the plurality of symbol images, concurrently display, in of the display screen, all of the plurality of characters that are placed in the virtual space;
an automatic control instructions that automatically control a first character in the first display area of the display screen to move to different locations within the virtual space independently of an ordered position of the corresponding symbol image and a move operation of the corresponding symbol image while a move operation for the corresponding symbol image displayed in the second display area of the display screen is not in progress,
wherein each one of the plurality of concurrently displayed symbol images is visually distinguishable from other ones of the plurality of concurrently displayed symbol images in the second display area of the display screen, and each one of the plurality of concurrently displayed characters is visually distinguishable from other ones of the plurality of concurrently displayed characters in the first display area of the display screen, and
a symbol image generating unit, by using the processing system, configured to generate each one of the plurality of concurrently displayed symbol images corresponding to a respective character of the plurality of characters, by rendering at least a part of the respective character.

2. The non-transitory computer-readable storage medium according to claim 1, wherein the display control program further causes the computer to function as:
a move operation detecting unit configured to, by using the processing system, detect a move operation of at least one symbol image of the plurality of symbol images displayed on the second display area of the display screen, based on an input from an input device, wherein
the symbol image display control unit further includes a symbol image move unit configured to, by using the processing system, move the at least one symbol image of the plurality of symbol images displayed on the second display area of the display screen to a position, in accordance with the move operation, and
the object display control unit further includes
an object move unit configured to, by using the processing system, move at least one character of the plurality of characters in the first display area of the display screen, which corresponds to the respective at least one symbol image, to a virtual space position corresponding to the position of the respective at least one symbol image moved by the symbol image move unit.

3. The non-transitory computer-readable storage medium according to claim 2, wherein the symbol image display control unit further includes an order change unit configured to, by using the processing system, change an order position of the at least one symbol image in the second display area of the display screen, based on the position of the at least one symbol image at a time point when the move operation of the at least one symbol image is ended.

4. The non-transitory computer-readable storage medium according to claim 2, wherein the symbol image display control unit further includes:
a determination unit configured to, by using the processing system, determine whether another of the plurality of symbol images is displayed at the position of the at least one symbol image in the second display area of the display screen at a time point when the move operation of the at least one symbol image is ended; and
an order interchange unit configured to, by using the processing system, interchange an order position of the at least one symbol image with an order position of the another of the plurality of symbol images in the second display area of the display screen, in the case where a determination result obtained by the determination unit is affirmative.

5. The non-transitory computer-readable storage medium according to claim 2, wherein the object move unit is further configured to, by using the processing system, move the at least one character for the move operation to a position at a height different from a height at which the other of the plurality of characters is positioned in the first display area of the display screen, while the move operation is in progress.

6. The non-transitory computer-readable storage medium according to claim 2, wherein the input device includes a pointing device configured to designate a position in the second display area of the display screen.

7. The non-transitory computer-readable storage medium according to claim 2, wherein:
the input device includes a touch panel provided on the second display area of the display screen, and
the move operation includes an operation of moving a touch position while the touch panel is being touched.

8. The non-transitory computer-readable storage medium according to claim 2, wherein the display control program further causes the computer to function as:
a display scale control unit configured to control a display scale of the virtual space displayed on the first display area of the display screen, and
when the move operation is started, the display scale control further reduces the display scale.

9. The non-transitory computer-readable storage medium according to claim 8, wherein when the move operation is ended, the display scale control unit is further configured to increase the display scale.

10. The non-transitory computer-readable storage medium according to claim 1, wherein the display control program further causes the computer to function as:
a move operation detecting unit configured to, by using the processing system, detect the move operation of at least one symbol image of the plurality of symbol images displayed on the second display area of the display screen, based on an input from an input device, wherein
while the move operation is in progress, move the at least one symbol image of the plurality of symbol images displayed on the second display area of the display screen in accordance with the move operation, and
wherein the first character displayed on the first display area of the display screen is automatically controlled when the move operation is not in progress in accordance with a predetermined algorithm.

11. The non-transitory computer-readable storage medium according to claim 10, wherein the automatic movement of the first character displayed on the first display area of the display screen begins at a predetermined time after the move operation is no longer performed.

12. The non-transitory computer-readable storage medium according to claim 10, wherein at a time point when the move operation is started, the object automatic control unit is further configured to move the at least one character displayed on the first display area of the display screen corresponding to the at least one symbol image displayed on the second display area of the display screen, to respective virtual space positions corresponding to current positions of the at least one symbol image on the second display area of the display screen.

13. The non-transitory computer-readable storage medium according to claim 1, wherein the first display area and the second display area of the display screen are provided in two display devices having different display types, respectively.

14. The non-transitory computer-readable storage medium according to claim 1, wherein the first display area of the display screen is provided in a display device which allows stereoscopic vision, and the second display area of the display screen is provided in a display device which does not allow stereoscopic vision.

15. The non-transitory computer-readable storage medium according to claim 1, wherein the symbol image display control unit is further configured to place the plurality of symbol images, according to the order thereof, at a plurality of placement areas previously set, respectively, and displays the plurality of symbol images on the second display area of the display screen.

16. The non-transitory computer-readable storage medium according to claim 15, wherein the symbol image display control unit is further configured to display the plurality of placement areas on the second display area of the display screen in a state which allows a user to view borders between the plurality of placement areas.

17. The non-transitory computer-readable storage medium according to claim 1, wherein the symbol image display control unit is further configured to display, in a list format, the plurality of symbol images on the second display area of the display screen, according to the order thereof.

18. The non-transitory computer-readable storage medium according to claim 1, wherein the symbol image display control unit is further configured to display, in a menu format, the plurality of symbol images on the second display area of the display screen, according to the order thereof.

19. The non-transitory computer-readable storage medium of claim 1, wherein the display control program further causes the computer to:
as a result of the move operation being detected, move the first character of the plurality of characters in the first display area of the display screen in the virtual space to a new position in accordance with the move operation of the corresponding symbol image displayed in the first display area of the display screen.

20. A display control apparatus for displaying, on a display screen, a plurality of character objects in a first display area of the display screen and a plurality of symbol images in a second display area of the display screen, which each corresponds to a respective one of the plurality of character objects, the display control apparatus comprising:

a processing system that includes at least one processor coupled to a memory, the processing system configured to:
output the plurality of symbol images to the second display area of the display screen for concurrent display thereon according to an order thereof, such that no other symbol images are visible when the plurality of symbol images are concurrently displayed on the display screen;
place all of the plurality of character objects at respective positions in the first display area of the display screen, which are based on the order used to concurrently display the plurality of symbol images in the second display area of the display screen, in a virtual space, so that the positional relationship of every one of the concurrently displayed plurality of symbol images corresponds a respective one of the plurality of character objects that has been placed in the virtual space; and when the plurality of symbol images are being concurrently displayed, concurrently output all of the plurality of character objects to the first display area of the display screen for concurrent display thereon,
automatically control a first virtual character displayed in the first display area of the display screen to move to different locations within the virtual space independently of a position of the corresponding symbol image and a move operation of the corresponding symbol image while a move operation for the corresponding symbol image displayed in the first display area of the display screen is not in progress,
wherein each one of the plurality of concurrently displayed symbol images is visually distinguishable from other ones of the plurality of concurrently displayed symbol images in the second display area of the display screen, and each one of the plurality of concurrently displayed character objects is visually distinguishable from other ones of the plurality of concurrently displayed character objects in the first display area of the display screen, and generate each one of the plurality of concurrently displayed symbol images corresponding to a respective character of the plurality of characters, by rendering at least a part of the respective character.

21. A display control method for displaying, on a display screen, a plurality of character objects in a first display area of the display screen and a plurality of symbol images in a second display area of the display screen, which respectively correspond to the plurality of character objects, the display control method comprising:
concurrently displaying the plurality of symbol images on the display screen at the second display area of the display screen, according to an order thereof, where no other symbol images are concurrently visible by a user when the displayed plurality of symbol images are concurrently displayed;
placing each one of the plurality of character objects at predetermined positions in the first display area of the display screen, which are based on the order used to display the plurality of symbol images in the second display area of the display screen, in a virtual space, so that the positional relationship of every one of the concurrently displayed plurality of symbol images corresponds the respective one of the plurality of character objects that has been placed in the virtual space; and with the concurrent display of the plurality of symbol images, concurrently displaying all of the plurality of character objects in the first display area of the display screen, automatically controlling a first virtual character displayed in the first display area of the display screen to move to different locations within the virtual space independently of a position of the corresponding symbol image and a move operation of the corresponding symbol image while a move operation for the corresponding symbol image displayed in the second display area of the display screen is not in progress, wherein each one of the plurality of concurrently displayed symbol images is visually distinguishable from other ones of the plurality of concurrently displayed symbol images in the second display area of the display screen, and each one of the plurality of concurrently displayed character objects is visually distinguishable from other ones of the plurality of concurrently displayed character objects in the first display area of the display screen, and generating each one of the plurality of concurrently displayed symbol images corresponding to a respective character of the plurality of characters, by rendering at least a part of the respective character.

22. A display control system comprising:

a display device that includes a display screen, the display device configured to display, on the display screen, a plurality of virtual characters in a first display area of the display screen and a plurality of symbol images in a second display area of the display screen that respectively correspond to the plurality of virtual characters; and a processing system that includes at least one processor, the processing system configured to:

output, to the display screen of the display device for concurrent display thereon, the plurality of symbol images to different positions on the second display area of the display screen in accordance with a determined order, where no other symbol images are output for concurrent display while the plurality of symbol images are output for concurrent display on the device;

for every one of the plurality of symbol images that is concurrently displayed on the second display area of the display screen of the display device, locate a corresponding virtual character from the plurality of virtual characters at a location of the first display area of the display screen within a virtual space, the location corresponding to the determined order of the corresponding symbol image within the plurality of symbol images; and output, to the display screen of the display device for display thereon in a first display area of the display screen, every one of the located plurality of virtual characters, where the positional relationship of every one of the located plurality of virtual characters in the first display area of the display screen has a corresponding symbol image that is currently being output for display on the second display area of the display screen of the display device, automatically control a first virtual character displayed in the first display area of the display screen to move, while a move operation for the corresponding symbol image displayed in the second display area of the display screen is not in progress, to different locations within the virtual space independently of: 1) a position of the corresponding symbol image, and 2) a move operation of the corresponding symbol image, wherein each one of the plurality of concurrently displayed symbol images is visually distinguishable from other ones of the plurality of concurrently displayed symbol images in the second display area of the display screen, and each one of the plurality of concurrently displayed virtual characters is visually distinguishable from other ones of the plurality of concurrently displayed virtual characters in the first display area of the display screen, and generate each one of the plurality of concurrently displayed symbol images corresponding to a respective character of the plurality of characters, by rendering at least a part of the respective character.

* * * * *